US011766956B2

(12) United States Patent
Napau et al.

(10) Patent No.: US 11,766,956 B2
(45) Date of Patent: *Sep. 26, 2023

(54) OPEN ARCHITECTURE POWER LENGTH ADJUSTER ASSEMBLY FOR A VEHICLE SEAT AND METHOD OF MANUFACTURING THE SAME

(71) Applicant: FISHER & COMPANY, INCORPORATED, St. Clair Shores, MI (US)

(72) Inventors: Mircea Napau, Sterling Heights, MI (US); Doina Napau, Sterling Heights, MI (US); Ileana Dacia Napau, Cugir (RO); Ioan Napau, Rochester Hills, MI (US); Dean Lenane, Grosse Pointe Woods, MI (US); Matthew Essian, Clinton Township, MI (US); Antal Teer, Harrison Township, MI (US); Sapan M. Poptani, Northville, MI (US); Radu Calin Napau-Stoica, Lupeni (RO)

(73) Assignee: Fisher & Company, Incorporated, St. Clair Shores, MI (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/493,287

(22) Filed: Oct. 4, 2021

(65) Prior Publication Data
US 2022/0024355 A1 Jan. 27, 2022

Related U.S. Application Data

(63) Continuation-in-part of application No. 17/062,931, filed on Oct. 5, 2020, now Pat. No. 11,273,506, which
(Continued)

(51) Int. Cl.
B60N 2/02 (2006.01)
B60N 2/06 (2006.01)

(52) U.S. Cl.
CPC ............ *B60N 2/0232* (2013.01); *B60N 2/06* (2013.01); *B60N 2002/0236* (2013.01)

(58) Field of Classification Search
CPC ........ B60N 2/0232; B60N 2/06; B60N 2/067; B60N 2/0705; B60N 2/0715; B60N 2002/0236
See application file for complete search history.

(56) References Cited

U.S. PATENT DOCUMENTS 546,249 A 9/1895 Regan
657,542 A 9/1900 Ingersoll
(Continued)

FOREIGN PATENT DOCUMENTS

CN 87101620 A 9/1988
CN 1109566 A 10/1995
(Continued)

OTHER PUBLICATIONS

Office Action regarding Chinese Patent Application No. 202010075280.8 dated Nov. 26, 2021.
(Continued)

Primary Examiner — Philip F Gabler
(74) Attorney, Agent, or Firm — Harness, Dickey & Pierce, P.L.C.

(57) ABSTRACT

A seat adjuster assembly for a vehicle seat assembly may include a housing, a worm, a spindle screw, a motor, and either a helical gear or a single-enveloping worm gear. The worm may be disposed within the housing for rotation about a first axis and having a thread. The helical gear or single-enveloping worm gear may be disposed within the housing for rotation about a second axis and meshingly-engaged with
(Continued)

a pitch surface of the thread of the worm. The spindle screw may extend along the second axis and through the housing and the helical gear or single-enveloping worm gear. The spindle screw may be meshingly-engaged with the helical gear or single-enveloping worm gear. The motor may drive the worm to cause linear movement of the housing, worm, motor, and the helical gear or single-enveloping worm gear along the second axis.

4 Claims, 16 Drawing Sheets

Related U.S. Application Data is a continuation-in-part of application No. 16/299,384, filed on Mar. 12, 2019, now Pat. No. 10,953,772, which is a continuation-in-part of application No. 15/680,363, filed on Aug. 18, 2017, now Pat. No. 10,486,554.

(60) Provisional application No. 62/641,780, filed on Mar. 12, 2018, provisional application No. 62/385,000, filed on Sep. 8, 2016.

(56) References Cited

U.S. PATENT DOCUMENTS

| | | |
|---|---|---|
| 978,371 A | 12/1910 | Harrison |
| 1,192,627 A | 7/1916 | Hatlee |
| 1,694,031 A | 12/1928 | Braren |
| 1,770,035 A | 7/1930 | Heap et al. |
| 2,168,164 A | 8/1939 | Kittredge |
| 2,170,951 A | 8/1939 | Perry |
| 2,250,259 A | 7/1941 | Foote, Jr. |
| 2,475,504 A | 7/1949 | Jackson |
| 2,508,121 A | 5/1950 | McIver |
| 2,609,713 A | 9/1952 | Martin |
| 2,972,910 A | 2/1961 | Menge, Sr. |
| 2,995,226 A | 8/1961 | Gilder |
| 3,013,447 A | 12/1961 | Hils et al. |
| 3,037,400 A | 6/1962 | Sundt |
| 3,144,791 A | 8/1964 | Menge, Sr. |
| 3,319,482 A | 5/1967 | Campbell et al. |
| 3,427,901 A | 2/1969 | Wildhaber |
| 3,451,290 A | 6/1969 | Wildhaber |
| 3,965,773 A | 6/1976 | Bert et al. |
| 4,023,441 A | 5/1977 | Osterwalder |
| 4,228,698 A | 10/1980 | Winiasz |
| 4,228,739 A | 10/1980 | Fitzgibbon |
| 4,269,075 A | 5/1981 | Crist et al. |
| 4,452,102 A | 6/1984 | Shaffer |
| 4,720,073 A | 1/1988 | Mann et al. |
| 4,721,337 A | 1/1988 | Tomita |
| 4,805,866 A | 2/1989 | Aihara et al. |
| 4,884,844 A | 12/1989 | Kershaw et al. |
| 4,930,367 A | 6/1990 | Nagasawa |
| 4,967,615 A | 11/1990 | Mills |
| 5,030,184 A | 7/1991 | Rennerfelt |
| 5,094,420 A | 3/1992 | Aihara et al. |
| 5,099,717 A | 3/1992 | Ochiai et al. |
| 5,222,402 A | 6/1993 | White et al. |
| 5,259,257 A | 11/1993 | Mouri |
| 5,292,164 A | 3/1994 | Rees |
| 5,314,158 A | 5/1994 | Mouri |
| 5,349,878 A | 9/1994 | White et al. |
| 5,425,683 A | 6/1995 | Bang |
| 5,505,668 A | 4/1996 | Koriakov-Savoysky et al. |
| 5,598,746 A | 2/1997 | Chen |
| 5,701,783 A | 12/1997 | Lin |
| 5,816,555 A | 10/1998 | Ito et al. |
| 5,865,506 A | 2/1999 | Sakamoto |
| 6,032,550 A | 3/2000 | Rugh |
| 6,138,974 A | 10/2000 | Okada et al. |
| D437,334 S | 2/2001 | Song |
| 6,220,642 B1 | 4/2001 | Ito et al. |
| 6,260,672 B1 | 7/2001 | Frohnhaus et al. |
| 6,260,922 B1 | 7/2001 | Frohnhaus et al. |
| 6,261,199 B1 | 7/2001 | Schlangen |
| 6,322,146 B1 | 11/2001 | Fisher, Jr. |
| 6,548,332 B2 | 4/2003 | Peng et al. |
| 6,742,409 B2 | 6/2004 | Blanchard |
| 6,915,998 B2 | 7/2005 | Borbe et al. |
| 7,041,024 B2 | 5/2006 | Becker et al. |
| 7,048,244 B2 | 5/2006 | Hauck |
| 7,051,986 B1 | 5/2006 | Taubmann et al. |
| 7,143,513 B2 | 12/2006 | Taubmann et al. |
| 7,198,243 B2 | 4/2007 | Hofschulte et al. |
| 7,313,982 B2 | 1/2008 | Wisner et al. |
| 7,322,257 B2 | 1/2008 | Becker et al. |
| 7,340,974 B2 | 3/2008 | Landskron et al. |
| 7,437,962 B2 | 10/2008 | Taubmann et al. |
| 7,571,666 B2 | 8/2009 | Borbe et al. |
| 7,703,347 B2 | 4/2010 | Porinsky et al. |
| 7,887,020 B2 | 2/2011 | Ferguson et al. |
| 8,061,228 B2 | 11/2011 | Becker et al. |
| 8,087,974 B2 * | 1/2012 | Maeda ............... B23F 21/026 451/147 |
| 8,113,074 B2 | 2/2012 | Wohrle et al. |
| 8,128,051 B2 | 3/2012 | Koga et al. |
| 8,171,823 B2 | 5/2012 | Koga et al. |
| 8,453,529 B2 | 6/2013 | Birker et al. |
| 8,485,489 B2 | 7/2013 | Hofschulte et al. |
| 8,777,794 B2 | 7/2014 | Oishi |
| 8,826,756 B2 | 9/2014 | Hoffmann et al. |
| 8,864,231 B2 | 10/2014 | Shimoda et al. |
| 8,904,895 B2 | 12/2014 | Woehrle et al. |
| 9,180,795 B2 | 11/2015 | Flieger et al. |
| 9,205,763 B2 | 12/2015 | Anticuar et al. |
| 9,415,713 B2 | 8/2016 | Line et al. |
| 9,421,891 B2 | 8/2016 | Andres et al. |
| 9,689,464 B2 * | 6/2017 | Hamakita ............... B23F 11/00 |
| 9,694,724 B2 | 7/2017 | Nagata et al. |
| 9,827,879 B2 | 11/2017 | Fujita et al. |
| 9,902,295 B2 | 2/2018 | Napau et al. |
| 10,021,991 B2 | 7/2018 | Klimm |
| 10,024,392 B2 | 7/2018 | Napau et al. |
| 10,195,975 B2 | 2/2019 | Becker et al. |
| 10,208,835 B2 | 2/2019 | Noguchi et al. |
| 10,220,730 B2 | 3/2019 | Nagata et al. |
| 10,220,732 B2 | 3/2019 | Auer et al. |
| 10,300,812 B2 | 5/2019 | Flieger et al. |
| 10,486,554 B2 * | 11/2019 | Napau .................... B60N 2/06 |
| 10,500,984 B2 | 12/2019 | Hoffmann |
| 10,562,411 B2 | 2/2020 | Higuchi et al. |
| 10,737,591 B2 | 8/2020 | Ito |
| 10,843,591 B2 | 11/2020 | Becker et al. |
| 10,857,910 B2 | 12/2020 | Madhu |
| 10,933,771 B2 | 3/2021 | Geiges et al. |
| 10,953,772 B2 * | 3/2021 | Napau .................... F16H 55/08 |
| 11,180,064 B2 | 11/2021 | Navatte et al. |
| 11,273,506 B2 * | 3/2022 | Napau .................... B23F 11/00 |
| 11,485,255 B2 * | 11/2022 | Napau .................... F16H 25/20 |
| 11,529,892 B2 * | 12/2022 | Napau .................... F16H 25/20 |
| 2004/0206195 A1 | 10/2004 | Landskron et al. |
| 2004/0221670 A1 | 11/2004 | Becker et al. |
| 2004/0254041 A1 | 12/2004 | Becker et al. |
| 2005/0082890 A1 | 4/2005 | Taubmann et al. |
| 2005/0116132 A1 | 6/2005 | Sakamaki |
| 2005/0126333 A1 | 6/2005 | Dohles et al. |
| 2005/0146174 A1 | 7/2005 | Maddelein et al. |
| 2005/0253036 A1 | 11/2005 | Li et al. |
| 2005/0269478 A1 | 12/2005 | Woehrle et al. |
| 2006/0084547 A1 | 4/2006 | Dill et al. |
| 2006/0117885 A1 | 6/2006 | Robson et al. |
| 2006/0213302 A1 | 9/2006 | Hoffmann et al. |
| 2006/0249644 A1 | 11/2006 | Folliot et al. |
| 2007/0029893 A1 | 2/2007 | Schuler et al. |
| 2007/0108360 A1 | 5/2007 | Ito et al. |
| 2007/0209857 A1 | 9/2007 | Wolf |
| 2007/0241602 A1 | 10/2007 | Thiel et al. |
| 2008/0261743 A1 | 10/2008 | Junkers |
| 2009/0045661 A1 | 2/2009 | Stoessel et al. |

(56) References Cited

U.S. PATENT DOCUMENTS

| | | |
|---|---|---|
| 2010/0139425 A1 | 6/2010 | Schulz et al. |
| 2010/0237216 A1 | 9/2010 | Napau et al. |
| 2010/0320352 A1 | 12/2010 | Weber |
| 2011/0079699 A1 | 4/2011 | Tarusawa et al. |
| 2011/0308340 A1 | 12/2011 | Bosecker et al. |
| 2012/0325033 A1 | 12/2012 | Bosecker et al. |
| 2013/0180348 A1 | 7/2013 | Andres et al. |
| 2013/0333496 A1 | 12/2013 | Boutouil et al. |
| 2014/0238188 A1 | 8/2014 | Ito |
| 2015/0020955 A1 | 1/2015 | Hoffmann et al. |
| 2015/0210187 A1 | 7/2015 | Harleb et al. |
| 2015/0283924 A1 | 10/2015 | Boutouil et al. |
| 2015/0360587 A1 | 12/2015 | Hoffmann et al. |
| 2016/0257223 A1 | 9/2016 | Markel et al. |
| 2016/0341214 A1 | 11/2016 | O'Toole et al. |
| 2017/0059017 A1 | 3/2017 | Napau et al. |
| 2017/0203677 A1 | 7/2017 | Becker et al. |
| 2017/0253145 A1* | 9/2017 | Runde .................. B60N 2/123 |
| 2017/0307053 A1* | 10/2017 | Riester .................. B60J 7/0573 |
| 2018/0065507 A1 | 3/2018 | Napau et al. |
| 2018/0201158 A1 | 7/2018 | Hoffmann |
| 2018/0334054 A1 | 11/2018 | Higuchi et al. |
| 2019/0152347 A1 | 5/2019 | Becker et al. |
| 2019/0202322 A1 | 7/2019 | Napau et al. |
| 2020/0215936 A1 | 7/2020 | Teer et al. |
| 2020/0262317 A1 | 8/2020 | Napau et al. |
| 2021/0016375 A1 | 1/2021 | Napau et al. |
| 2021/0252997 A1 | 8/2021 | Gropp et al. |

FOREIGN PATENT DOCUMENTS

| | | |
|---|---|---|
| CN | 1251411 A | 4/2000 |
| CN | 1309750 A | 8/2001 |
| CN | 101178116 A | 5/2008 |
| CN | 101448674 A | 6/2009 |
| CN | 201350516 Y | 11/2009 |
| CN | 101970900 A | 2/2011 |
| CN | 102510817 A | 6/2012 |
| CN | 101528502 B | 8/2012 |
| CN | 103095041 A | 5/2013 |
| CN | 103101455 A | 5/2013 |
| CN | 203146709 U | 8/2013 |
| CN | 103498891 A | 1/2014 |
| CN | 204226562 U | 3/2015 |
| CN | 104520140 A | 4/2015 |
| CN | 104802666 A | 7/2015 |
| CN | 204774719 U | 11/2015 |
| CN | 204774722 U | 11/2015 |
| CN | 105270212 A | 1/2016 |
| CN | 105599643 A | 5/2016 |
| CN | 107804196 A | 3/2018 |
| CN | 207078030 U | 3/2018 |
| CN | 208306408 U | 1/2019 |
| CN | 208324966 U | 1/2019 |
| CN | 109538741 A | 3/2019 |
| CN | 110475691 A | 11/2019 |
| DE | 1755740 A1 | 1/1972 |
| DE | 3107455 A1 | 10/1982 |
| DE | 19815283 A1 | 10/1999 |
| DE | 19861100 A1 | 2/2000 |
| DE | 19911432 A1 | 9/2000 |
| DE | 10139631 A1 | 3/2003 |
| DE | 10250994 A1 | 8/2003 |
| DE | 10247204 A1 | 4/2004 |
| DE | 10203983 B4 | 5/2004 |
| DE | 10327103 A1 | 12/2004 |
| DE | 102004013543 A1 | 10/2005 |
| DE | 102005044467 B3 | 3/2007 |
| DE | 202008016335 U1 | 3/2009 |
| DE | 102009006815 A1 | 8/2009 |
| DE | 102013009846 A1 | 12/2013 |
| DE | 10362326 B4 | 2/2014 |
| DE | 102015205440 A1 | 9/2016 |
| DE | 102017100934 A1 | 7/2017 |
| DE | 102017008036 A1 | 3/2018 |
| EP | 0450324 A2 | 10/1991 |
| EP | 0617213 A1 | 9/1994 |
| EP | 0848672 B1 | 12/1999 |
| EP | 0992711 A2 | 4/2000 |
| EP | 1068093 A1 | 1/2001 |
| EP | 1167113 A1 | 1/2002 |
| EP | 1026027 B1 | 3/2004 |
| EP | 1442923 A2 | 8/2004 |
| EP | 1601550 B1 | 10/2012 |
| FR | 679410 A | 4/1930 |
| FR | 2517018 A3 | 5/1983 |
| FR | 2872747 A1 | 1/2006 |
| FR | 2882975 A1 | 9/2006 |
| GB | 2389066 A | 12/2003 |
| GB | 2404704 A | 2/2005 |
| JP | S62184939 A | 8/1987 |
| JP | H08197988 A | 8/1996 |
| JP | 2010112553 A | 5/2010 |
| JP | 2015134513 A | 7/2015 |
| JP | 2018203208 A | 12/2018 |
| KR | 20090071616 A | 7/2009 |
| KR | 101470180 B1 | 12/2014 |
| KR | 101501384 B1 | 3/2015 |
| KR | 101518647 B1 | 5/2015 |
| KR | 101708126 B1 | 2/2017 |
| WO | WO-8606036 A1 | 10/1986 |
| WO | WO-9709192 A1 | 3/1997 |
| WO | WO-03074209 A2 | 9/2003 |
| WO | WO-2009092946 A2 | 7/2009 |
| WO | WO-2010116125 A1 | 10/2010 |
| WO | WO-2011098161 A1 | 8/2011 |
| WO | WO-2011137989 A1 | 11/2011 |
| WO | WO-2012150050 A1 | 11/2012 |
| WO | WO-2013010888 A2 | 1/2013 |
| WO | WO-2015161714 A1 | 10/2015 |
| WO | WO-2018221977 A1 | 12/2018 |

OTHER PUBLICATIONS

Office Action for U.S. Appl. No. 16/737,991, dated May 27, 2022.
Office Action regarding Chinese Patent Application No. 2020101047053, dated Jul. 14, 2022.
Notice of Allowance regarding U.S. Appl. No. 17/236,639 dated Aug. 23, 2022.
Notice of Allowance regarding U.S. Appl. No. 17/553,445 dated Sep. 8, 2022.
Office Action regarding Chinese Patent Application No. 2020800083671, dated Dec. 5, 2022.
Office Action regarding Chinese Patent Application No. 2021104836972, dated Jan. 20, 2023.
Office Action for U.S. Appl. No. 17/062,931, dated Sep. 9, 2021.
Office Action regarding Chinese Patent Application No. 202010104705.3 dated Feb. 7, 2022.
Notice of Allowance regarding U.S. Appl. No. 17/236,639 dated Apr. 18, 2022.
Office Action regarding German Patent Application No. 1020170080364, dated May 24, 2022.
Office Action regarding German Patent Application No. 1020202002053, dated Sep. 8, 2022.
Non-Final Office Action regarding U.S. Appl. No. 16/787,420 dated Oct. 6, 2022.
Dicker Jr. et al., "Worms and Worm Gears." Theory of Machines and Mechanisms, 3rd ed., Oxford University Press, 2003, pp. 306-310.
International Search Report regarding International Application No. PCT/US2016/048649, dated Nov. 28, 2016.
Written Opinion of the International Searching Authority regarding International Application No. PCT/US2016/048649, dated Nov. 28, 2016.
International Search Report regarding International Application No. PCT/US2016/048634, dated Dec. 21, 2016.
Written Opinion of the International Searching Authority regarding International Application No. PCT/US2016/048634, dated Dec. 21, 2016.

(56) References Cited

OTHER PUBLICATIONS

Office Action regarding German Patent Application No. 102017008036.4, dated Apr. 5, 2018.
Office Action regarding Korean Patent Application No. 10-2017-0114314, dated Sep. 28, 2018.
Office Action regarding Korean Patent Application No. 10-2017-0114314, dated Mar. 27, 2019.
International Search Report regarding International Application No. PCT/US2019/021870, dated Jun. 25, 2019.
Written Opinion of the International Searching Authority regarding International Application No. PCT/US2019/021870, dated Jun. 25, 2019.
Office Action regarding Chinese Patent Application No. 201710791607.X, dated Aug. 5, 2019.
Office Action regarding Korean Patent Application No. 10-2017-0114314, dated Sep. 9, 2019.
Office Action regarding Chinese Patent Application No. 201710791607.X, dated Apr. 21, 2020.
International Search Report regarding International Application No. PCT/US2020/012857, dated Apr. 29, 2020.
Written Opinion of the International Searching Authority regarding International Application No. PCT/US2020/012857, dated Apr. 29, 2020.
Office Action regarding German Patent Application No. 102017008036.4, dated Jul. 17, 2020.
Office Action regarding German Patent Application No. 102020200205.3, dated Aug. 20, 2020. Partial translation provided by Bardehle Pagenberg Partnerschaft mbB.
Office Action regarding German Patent Application No. 112019000026.8, dated Sep. 25, 2020. Partial translation provided by Bardehle Pagenberg Partnerschaft mbB.
Office Action regarding Chinese Patent Application No. 201710791607.X, dated Dec. 22, 2020.
Office Action regarding German Patent Application No. 102017100934.5, dated Jan. 27, 2021. Translation provided by Witte, Weller & Partner Patentanwälte mbB.
Office Action regarding Korean Patent Application No. 10-2019-7026939, dated Feb. 19, 2021. Translation provided by Koryo IP & Law.
Office Action regarding Chinese Patent Application No. 2020101047053, dated Oct. 27. 2022.
Office Action regarding German Patent Application No. 1020170080364, dated May 17, 2022.

* cited by examiner

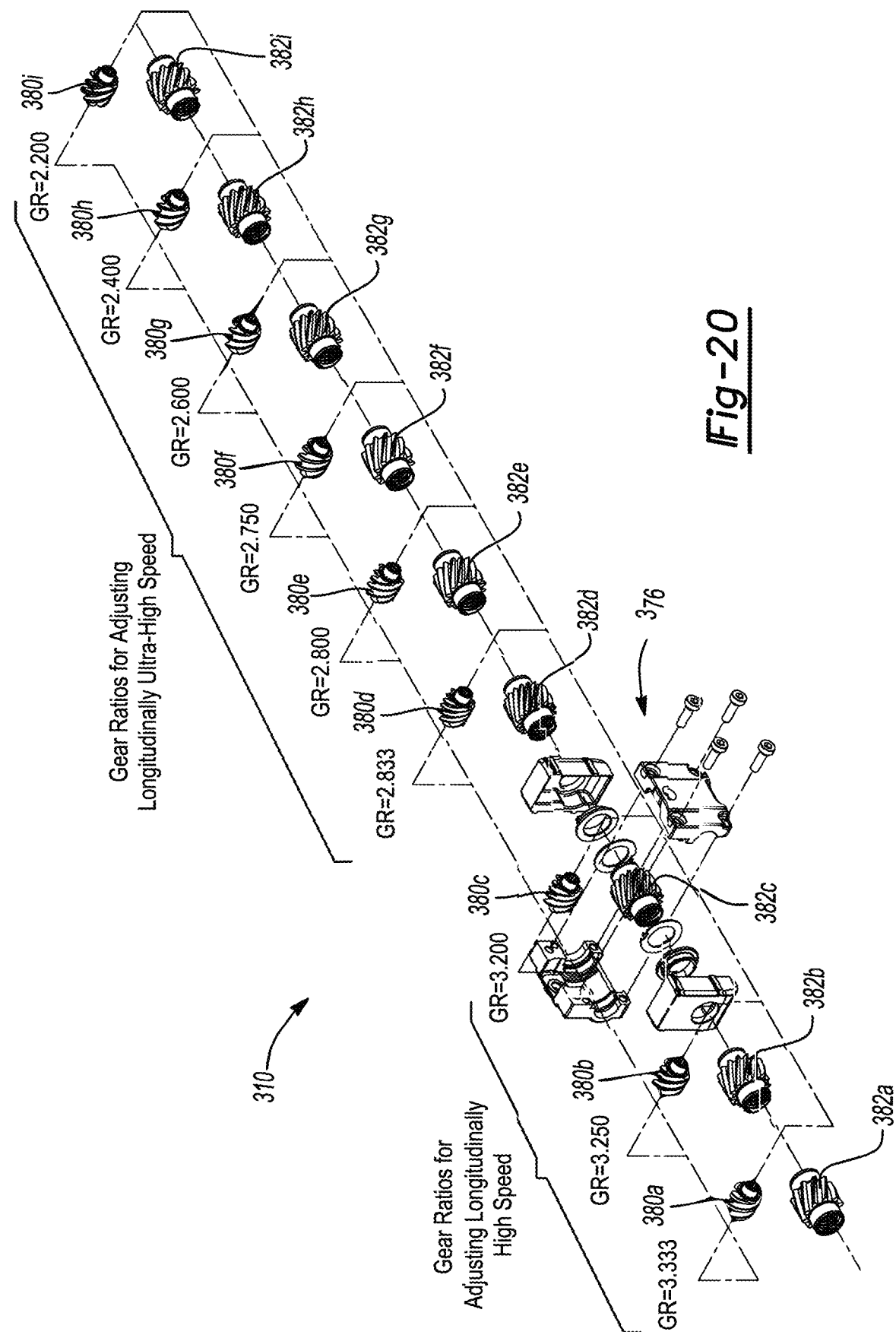

OPEN ARCHITECTURE POWER LENGTH ADJUSTER ASSEMBLY FOR A VEHICLE SEAT AND METHOD OF MANUFACTURING THE SAME

CROSS-REFERENCE TO RELATED APPLICATIONS

This application is a continuation-in-part of U.S. patent application Ser. No. 17/062,931 filed on Oct. 5, 2020, which is a continuation-in-part of U.S. patent application Ser. No. 16/299,384 filed on Mar. 12, 2019, which claims priority to U.S. Provisional Application No. 62/641,780 filed on Mar. 12, 2018 and which is a continuation-in-part of U.S. patent application Ser. No. 15/680,363 filed on Aug. 18, 2017, which claims priority to United States Provisional Application No. 62/385,000 filed on Sep. 8, 2016. The entire disclosures of each of the above applications are incorporated herein by reference.

FIELD

The present disclosure relates generally to a seat track assembly for a vehicle seat, and more particularly, to a power seat length adjuster assembly having an open architecture, an improved gear drive, and spindle drive actuation for adjusting a longitudinal position of the vehicle seat. The present disclosure also relates to a method of manufacturing the power seat length adjuster assembly.

BACKGROUND

This section provides background information related to the present disclosure and is not necessarily prior art.

Vehicles such as automobiles, for example, typically include at least one seat assembly that is movable in one or more directions (e.g., fore-aft, up-down, angular orientation, etc.) relative to a portion (e.g., a floor pan) of the vehicle in order to accommodate occupants of different size and height as well as to provide a comfortable seating position to suit the occupant's preference. Such seat assemblies often include power operated seat length adjuster assemblies.

Power operated seat length adjuster assemblies are driven by electric motors, their size being directly linked to the torque they must provide to produce the required motion. Thus, if a reasonably high reduction gear ratio can be achieved in very limited space, smaller and faster electric motors can be used to providing the same level of mechanical power needed for the required function.

The maximum speed of the electric motor in most power operated seat length adjuster assemblies is limited by the noise and vibrations the electric motor is going to generate during operation. In order to deliver the required torques at limited speeds that would avoid developing noise over a certain level in operation, the gear reduction ratio must be carefully selected for each specific application.

Typically, a power operated seat length adjuster assembly is actuated by an occupant-controlled switch and includes a bi-directional electric motor, mounted centrally or intermediately between the vehicle seat pair of track assemblies. The electric motor operably rotates two flex drive shafts extending outwardly from two gearbox blocks that are fixedly mounted inside of each upper or inner track assemblies. Each gearbox block includes a worm-worm gear or a worm-helical gear drive assembly that are rotationally driven through the flex drive shaft. Each spindle drive assembly includes a rotatable spindle nut that threadingly receives a lead screw extending longitudinally along and fixed to the lower or outer track assembly. Through these two drives, the electric motor rotational movement is orthogonally offset to the linear fore and aft movement of the upper tracks relative to the lower tracks, along spindle screw axes. The vehicle seat is attached to a frame supported by the pair of upper tracks, which are disposed parallel to one another, while the pair of lower tracks are fastened to the vehicle chassis. Typically, two drive shafts, gear boxes, lead screws and drive nuts are employed in a power length adjuster drive assembly, with one set for each seat track assembly, and both are driven by only one bi-directional electric motor.

Traditional worm-worm gear and worm-helical gear drives have been known to generate, propagate, and transmit a great deal of vibration and noise to both the vehicle seat slide and the surrounding environment. It is unpleasant, undesirable, and generally unacceptable in today's vehicle market for any such vibration or noise to be perceived by an occupant of the vehicle or seat assembly. Further, prolonged or recurring exposure to vibration can cause loosening and degradation of the component elements of the horizontal drive mechanism, vehicle seat slide, and seat assembly. Thus, a significant problem associated with prior art seat length adjuster assemblies has been the generation, propagation and transmission of noise and vibration to the vehicle seat slide and the surrounding environment during fore-aft adjustment of the seat assembly.

SUMMARY

This section provides a general summary of the disclosure, and is not a comprehensive disclosure of its full scope or all of its features.

In accordance with an aspect of the present disclosure, a seat adjuster assembly having a housing, a worm, and a worm gear is provided. The worm is disposed within the housing and is rotatable about a first axis. The worm has a helical thread. The worm gear is also disposed within the housing and is rotatable about a second axis. The worm gear is meshingly-engaged with a pitch surface of the helical thread of the worm. A spindle screw extends through the housing and the worm gear along the second axis. The spindle screw is meshingly-engaged with the worm gear. The pitch surface of the helical thread of the worm is longitudinally crowned such that the pitch surface has an arcuate profile. The longitudinal crowning of the helical thread of the worm localizes the theoretical point contact in a central region of each tooth of the worm gear, thus avoiding edge contact between the helical thread and worm gear teeth flanks. Longitudinal crowning of the worm may also provide a parabolic function of negative transmission errors (worm gear flanks lags with respect to the helical thread) that is able to absorb the linear functions of transmission errors and reduce vibrations.

The worm gear, which is configured to meshingly-engage the worm, may be manufactured from steel by a radial infeed hobbing process, using an oversized, conventional non-topping hob. In such a case, the root of the hob clears the outside diameter of the worm gear blank. The oversized, non-topping hob may increase the radius of curvature of each worm gear tooth, causing a contact location of each worm gear tooth to be concentrated in the center of the worm gear tooth. The hobbing process of the worm gear teeth, using an oversized non-topping hob, allows for a theoretical point contact between the helical thread and the worm gear tooth flank, instead of a line contact. The point contact location may reduce the sensitivity of the worm and worm gear to center distance variation as well as to any misalignment errors during assembly. In addition, using an oversized, non-topping hob may allow for an increased number of flutes of the hob, which considerably improves the quality of the cut surface of the worm gear tooth flank.

In some situations, using an oversized non-topping hob for cutting the worm gear teeth could lead to teeth with sharp edges on the outside diameter, in the worm gear in the central region of the worm gear width. These sharp edges could wear out the mating worm flanks processed by an injection plastic process while in meshing. To avoid this phenomenon, it is another aspect of the present disclosure to use a topping hob for cutting the teeth of the worm gear. In this case, the edges of the worm gear teeth can be provided with a radius on the outside diameter in the worm gear, in the central region of the worm gear width. Such a topping hob can cut the outside diameter of the worm gear blank simultaneously with the teeth, whereby the outside diameter of the blank are generated concentric with cut teeth.

In accordance with another aspect of the present disclosure, the helical thread of the worm may be double-crowned along the pitch surface. In accordance with this arrangement, the pitch surface of the helical thread of the worm is longitudinally crowned such that the pitch surface has an arcuate profile moving from a proximal end of the worm to a distal end of the worm. The pitch surface of the helical thread of the worm also has a tooth profile, which extends in an angular direction between a top land and a bottom land of the helical thread. The tooth profile is crowned outwardly along a convex curve. This arrangement further reduces contact between the pitch surface of the helical thread of the worm and the gear teeth of the worm gear to a theoretical point contact.

According to another aspect, the present disclosure provides a method of manufacturing a gear drive for a seat adjuster assembly. The method includes the step of applying a cutting process to a worm gear blank to cut gear teeth into the worm gear blank and form a single-enveloping worm gear using an oversized non-topping hob or an oversized topping hob. The hob could be a ZN-type or ZA-type hob, for example, or other type. The method also includes the step of forming a worm with a helical thread that includes a pitch surface that is configured to mesh with the gear teeth of the single-enveloping worm gear. As part of this method, a longitudinal crown is created on the pitch surface of the helical thread of the worm such that the pitch surface has an arcuate profile moving from a proximal end of the worm to a distal end of the worm. In addition, a crowned tooth profile is created on the helical thread of the worm that extends in an angular direction between a top land and a bottom land of the helical thread. The crowned tooth profile bows outwardly along a convex curve. The step of forming the worm can be performed using an injection molding process. The step of applying a cutting process to the worm gear blank to cut the gear teeth into the worm gear blank can include using an oversized non-topping hob or an oversized topping hob having straight edges in the hob normal section or straight edges in the hob axial section.

According to another aspect, the present disclosure provides a seat adjuster assembly that may include a housing, a worm, a helical gear, a spindle screw, and a motor. The worm has a thread and may be disposed within the housing for rotation about a first axis. The helical gear may be disposed within the housing for rotation about a second axis and may be meshingly-engaged with a pitch surface of the thread of the worm. The spindle screw may extend through the housing and the helical gear along the second axis. The spindle screw may be meshingly-engaged with the helical gear. The motor may drive the worm. A gear ratio of the worm to the helical gear is selected from the group consisting of: 3.333, 3.25, 3.2, 2.833, 2.8, 2.75, 2.6, 2.4, and 2.2.

In some configurations, the motor may have a maximum rotational velocity of 5,500 revolutions per minute or less.

In some configurations in which the gear ratio of the worm to the helical gear is selected from the group consisting of: 3.333, 3.25, and 3.2, the housing, the worm, and the helical gear move linearly along a length of the spindle screw at a velocity of 55-60 millimeters per second during operation of the motor.

In some configurations in which the gear ratio of the worm to the helical gear is selected from the group consisting of: 2.833, 2.8, 2.75, 2.6, 2.4, and 2.2, the housing, the worm, and the helical gear move linearly along a length of the spindle screw at a velocity of 85-90 millimeters per second during operation of the motor.

A seat track assembly may include the seat adjuster assembly of any of the above paragraphs and may include a lower seat track and an upper seat track that is configured to engage the lower seat track and slide along a length of the lower seat track. The housing may be configured to be mounted to the upper seat track.

According to another aspect, the present disclosure provides a kit of components including a housing, a first set of gears, a second set of gears, a spindle screw, and a motor. The housing may include a first housing portion and a second housing portion, wherein each of the first and second housing portions includes a longitudinal recess and an upper recess. The first set of gears may include a first worm and a first helical gear. The first worm is configured to be selectively received within the upper recesses of the first and second housing portions. The first helical gear is configured to be selectively received within the longitudinal recesses of the first and second housing portions. A gear ratio of the first worm to the first helical gear is selected from the group consisting of: 3.333, 3.25, and 3.2. The second set of gears may include a second worm and a second helical gear. The second worm is configured to be selectively received within the upper recesses of the first and second housing portions. The second helical gear is configured to be selectively received within the longitudinal recesses of the first and second housing portions. A gear ratio of the second worm to the second helical gear is selected from the group consisting of: 2.833, 2.8, 2.75, 2.6, 2.4, and 2.2. The spindle screw is configured to extend through the housing and a selected one of the first and second helical gears. The motor is configured to drive a selected one of the first and second worms.

In some configurations, the motor has a maximum rotational velocity of 5,500 revolutions per minute or less.

In some configurations, the housing and the first set of gears are configured to move linearly along a length of the spindle screw at a velocity of 55-60 millimeters per second during operation of the motor.

In some configurations, the housing and the second set of gears are configured to move linearly along a length of the spindle screw at a velocity of 85-90 millimeters per second during operation of the motor.

In some configurations, the kit of components includes a lower seat track and an upper seat track that is configured to engage the lower seat track and slide along a length of the lower seat track. The housing is configured to be mounted to the upper seat track.

According to another aspect, the present disclosure provides a kit of components including a housing, a first set of gears, a second set of gears, a spindle screw, and a motor. The housing may include a first housing portion and a second housing portion, wherein each of the first and second housing portions includes a longitudinal recess and an upper recess. The first set of gears may include a first worm and a first single-enveloping worm gear. The first worm is configured to be selectively received within the upper recesses of the first and second housing portions. The first single-enveloping worm gear is configured to be selectively received within the longitudinal recesses of the first and second housing portions. A gear ratio of the first worm to the first single-enveloping worm gear is selected from the group consisting of: 8.5, 7.5, and 6.5. The second set of gears may include a second worm and a second single-enveloping worm gear. The second worm is configured to be selectively received within the upper recesses of the first and second housing portions. The second single-enveloping worm gear is configured to be selectively received within the longitudinal recesses of the first and second housing portions. A gear ratio of the second worm to the second single-enveloping worm gear is selected from the group consisting of: 5.667, 5.333, 4.667, 4.333, 3.667, and 3.333. The spindle screw is configured to extend through the housing and a selected one of the first and second helical gears. The motor is configured to drive a selected one of the first and second worms.

In some configurations, the motor has a maximum rotational velocity of 5,500 revolutions per minute or less.

In some configurations, the housing and the first set of gears are configured to move linearly along a length of the spindle screw at a velocity of 17-22 millimeters per second during operation of the motor.

In some configurations, the housing and the second set of gears are configured to move linearly along a length of the spindle screw at a velocity of 55-60 millimeters per second during operation of the motor.

In some configurations, the kit of components includes a lower seat track and an upper seat track that is configured to engage the lower seat track and slide along a length of the lower seat track. The housing is configured to be mounted to the upper seat track.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
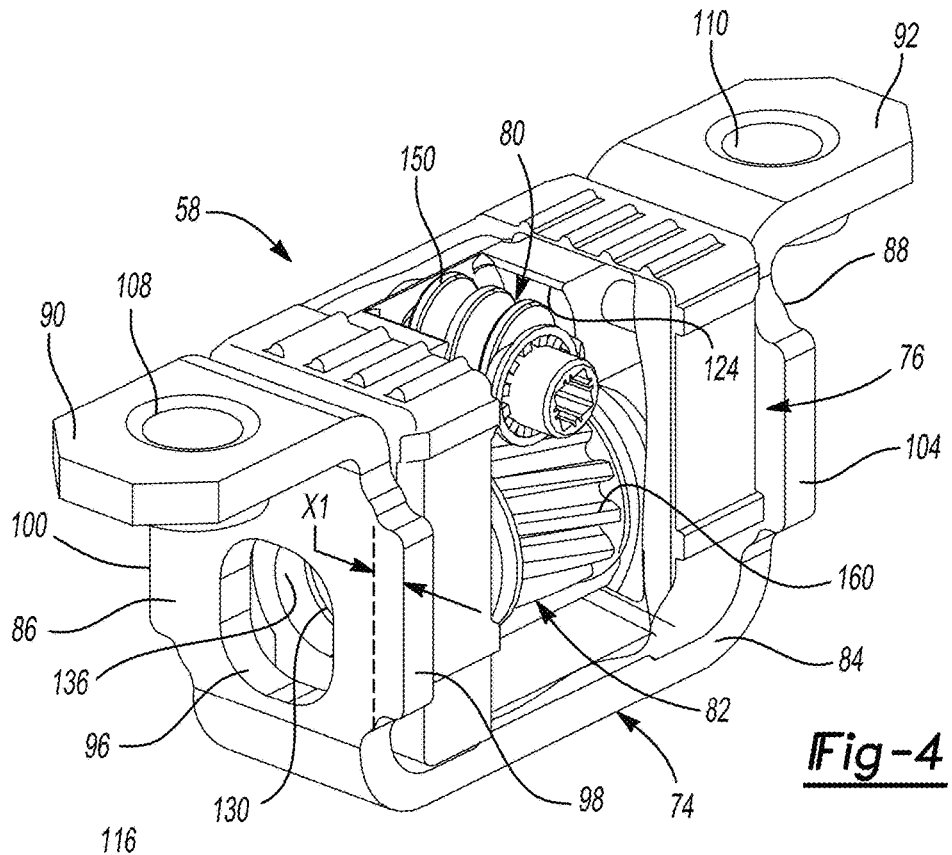
Figure 5:
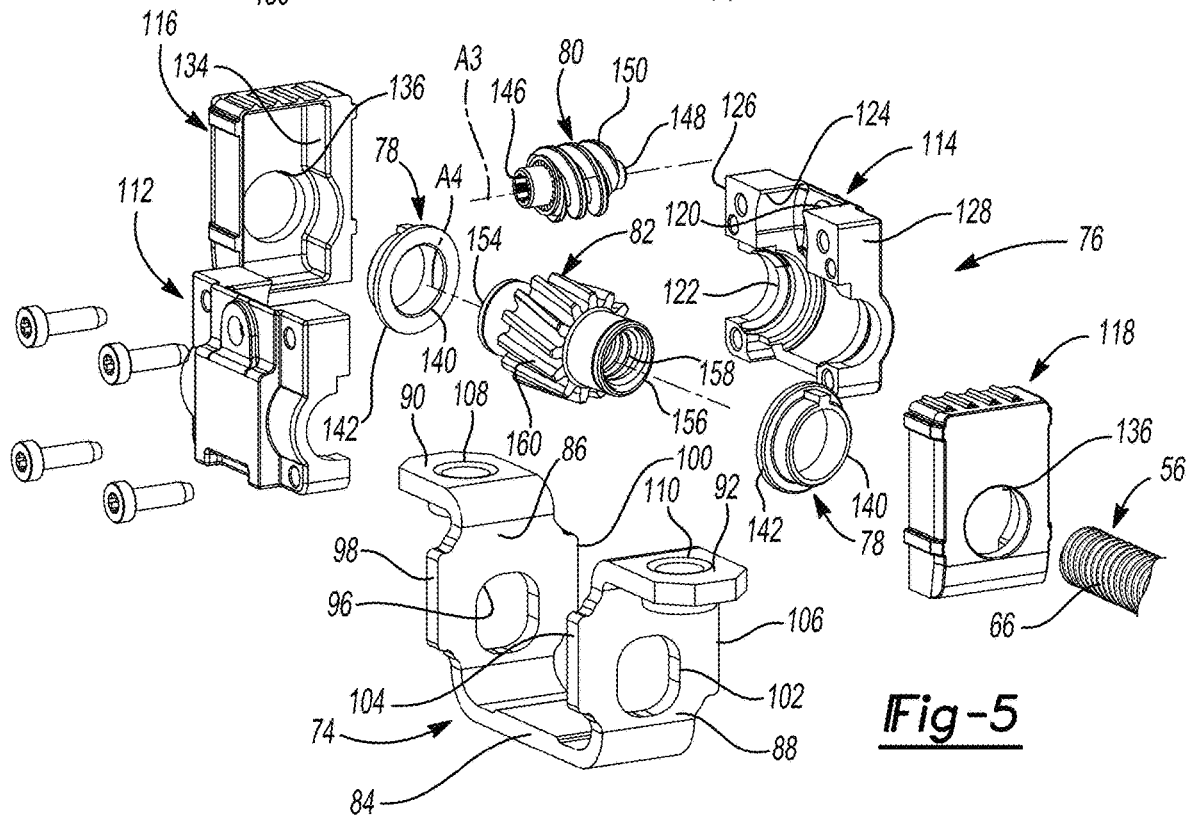
Figure 6:
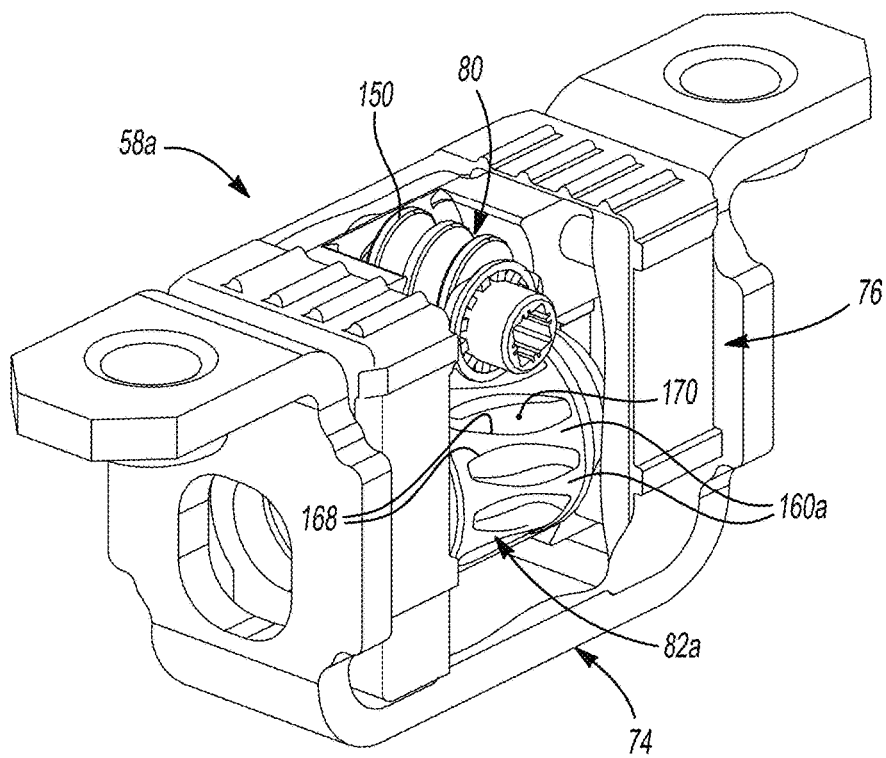
Figure 7:
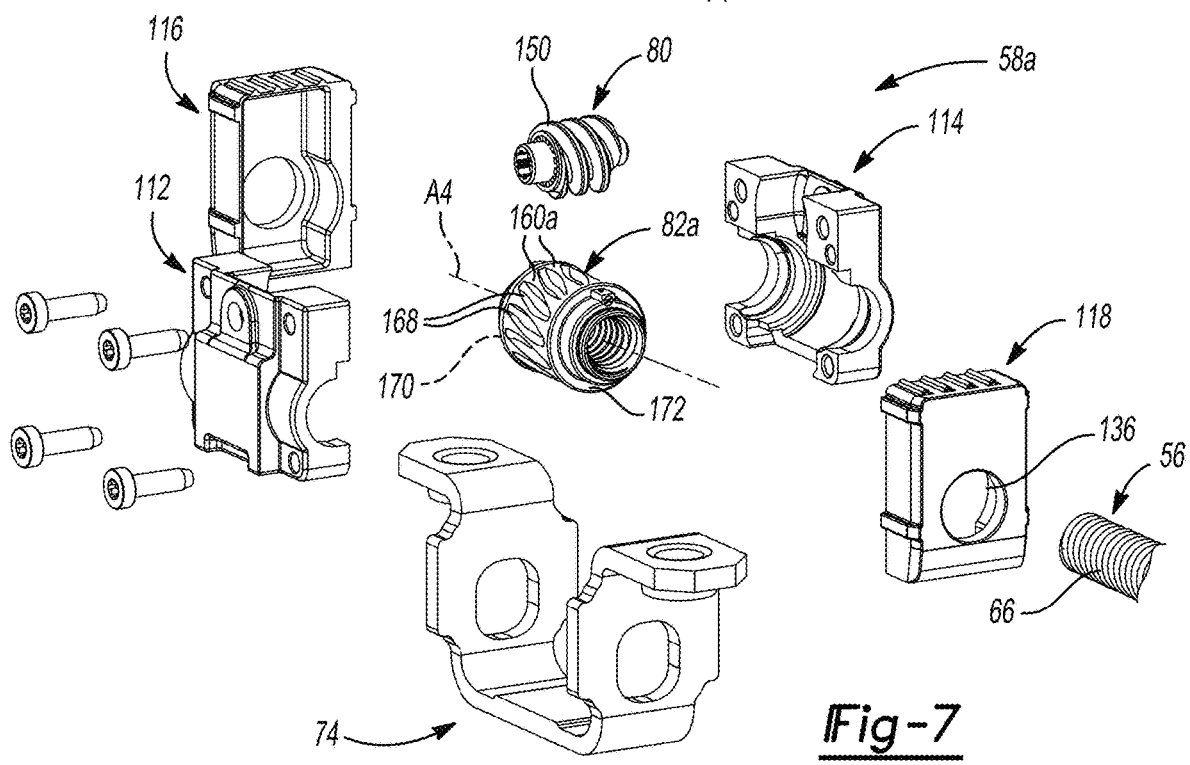
Figure 8:
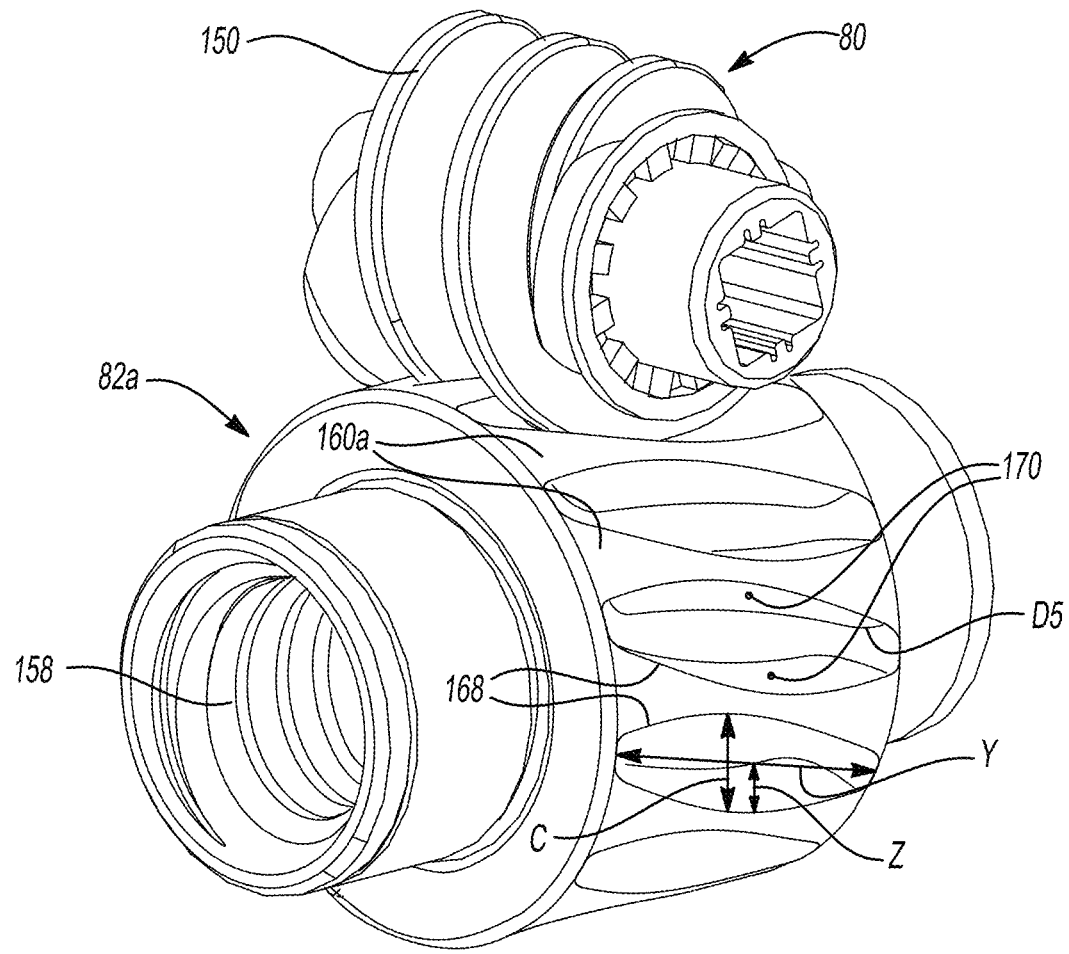
Figure 9A:
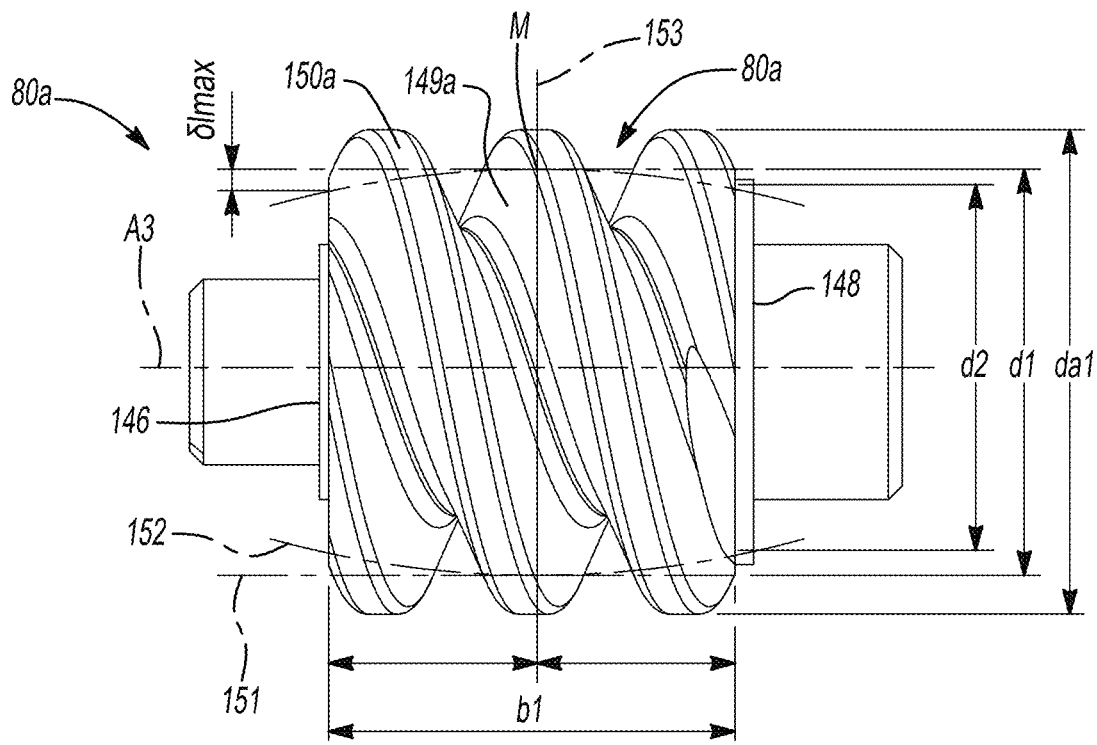
Figure 9B:
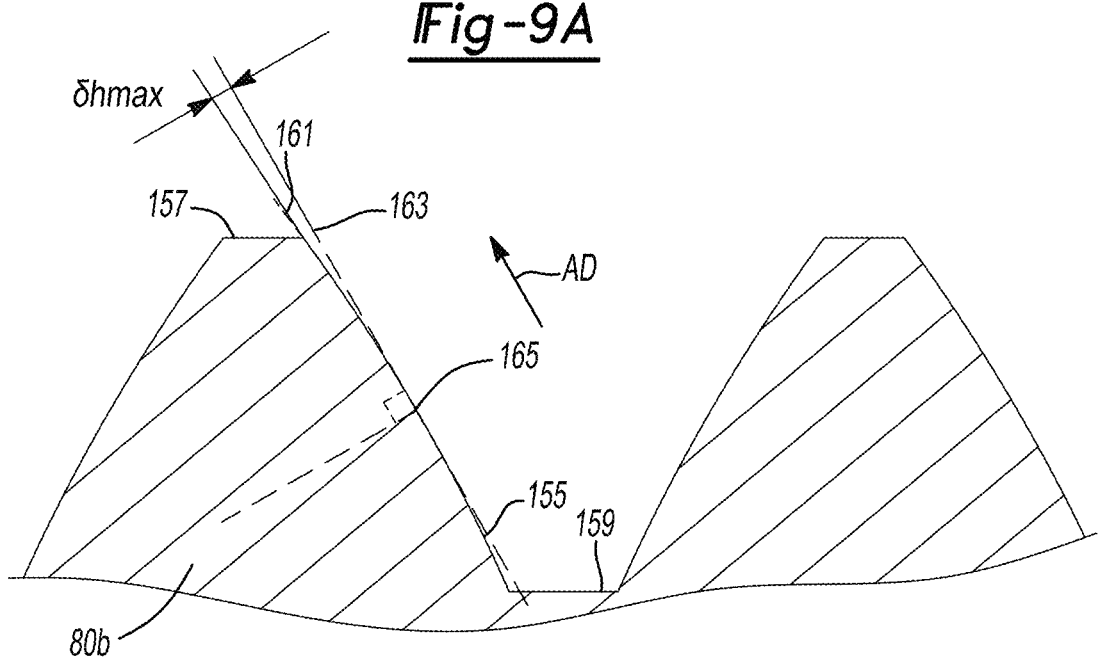
Figure 10:
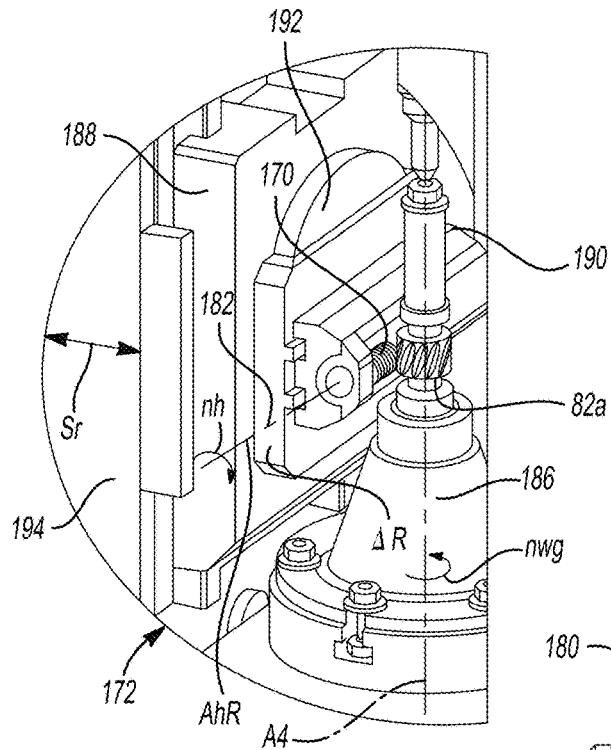
Figure 11:
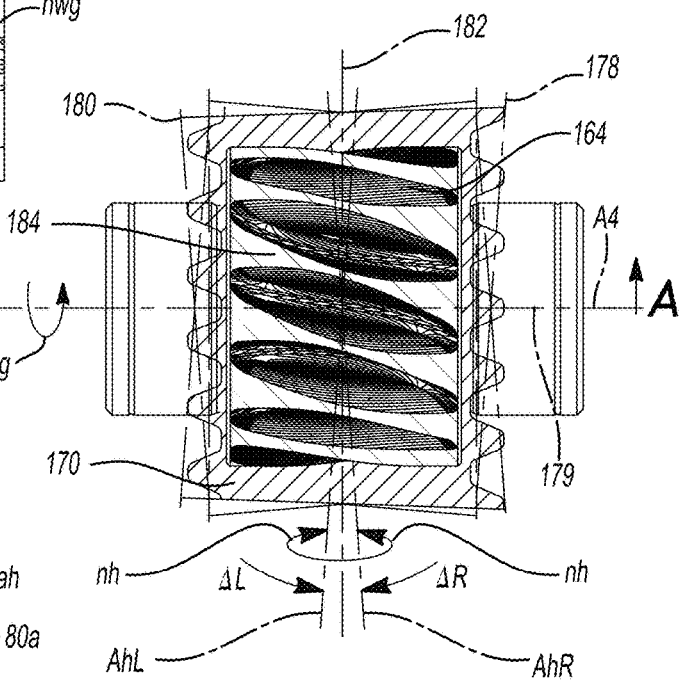
Figure 12:
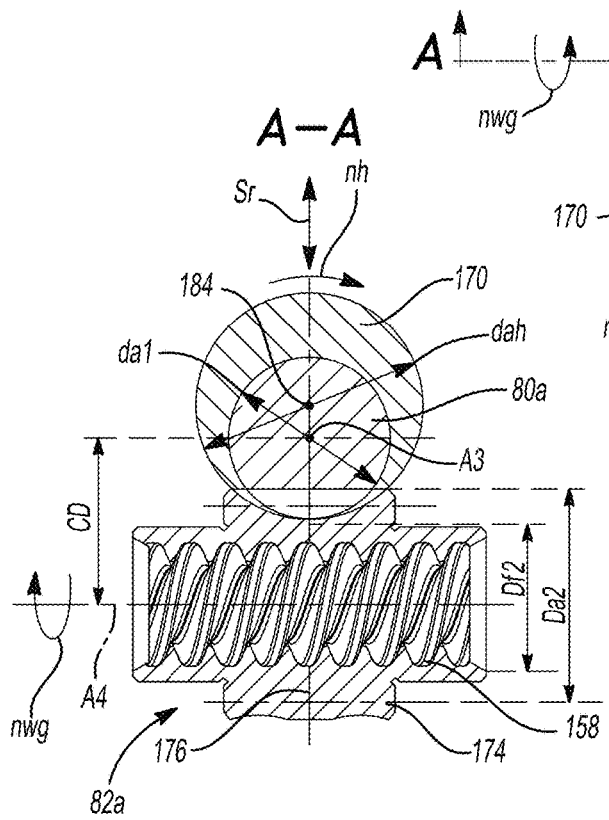
Figure 10B:
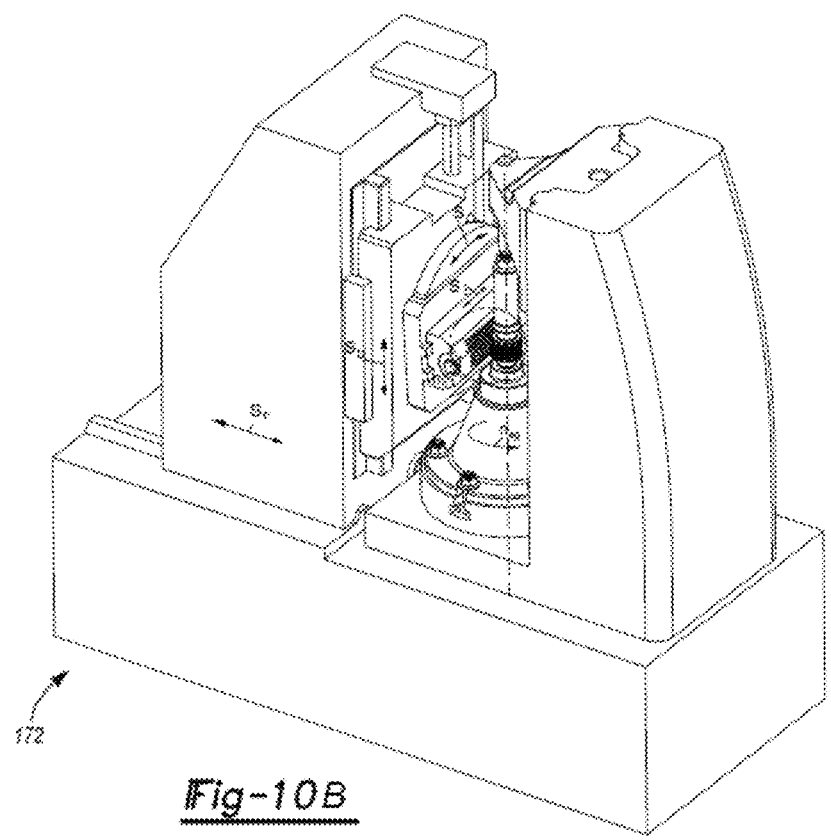
Figure 10A:
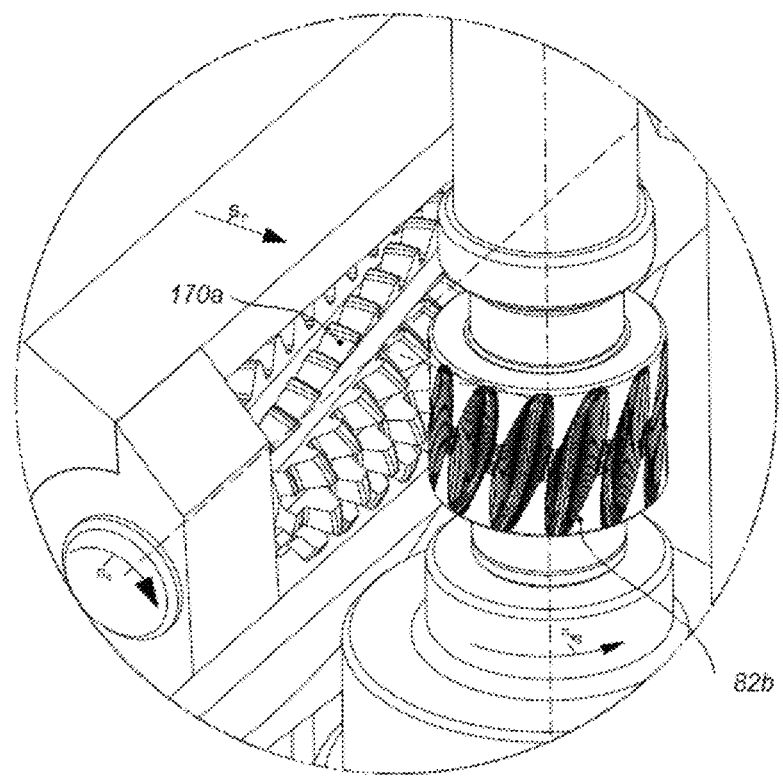
Figure 10C:
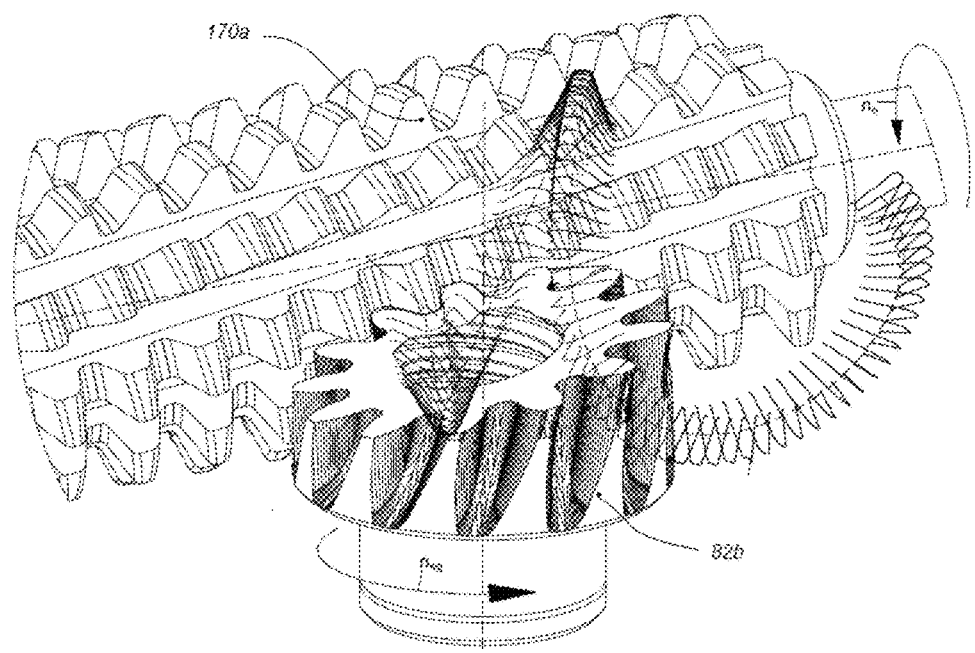
Figure 10D:
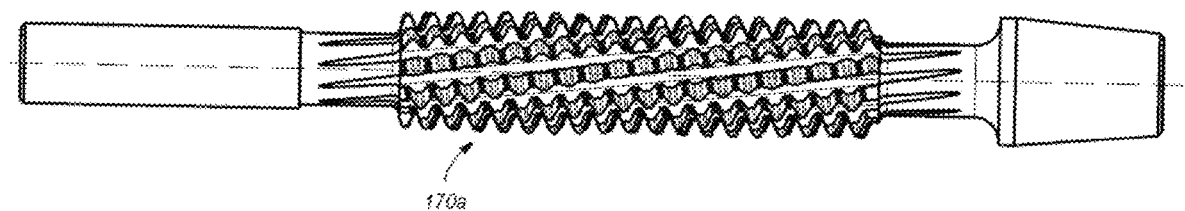
Figure 10E:
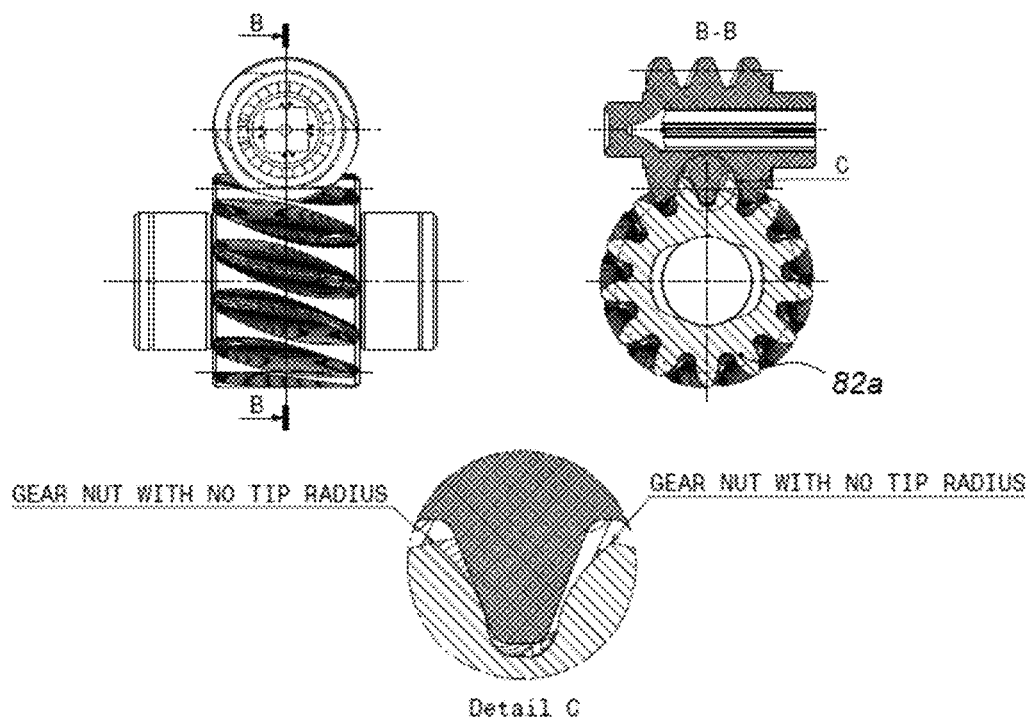
Figure 10F:
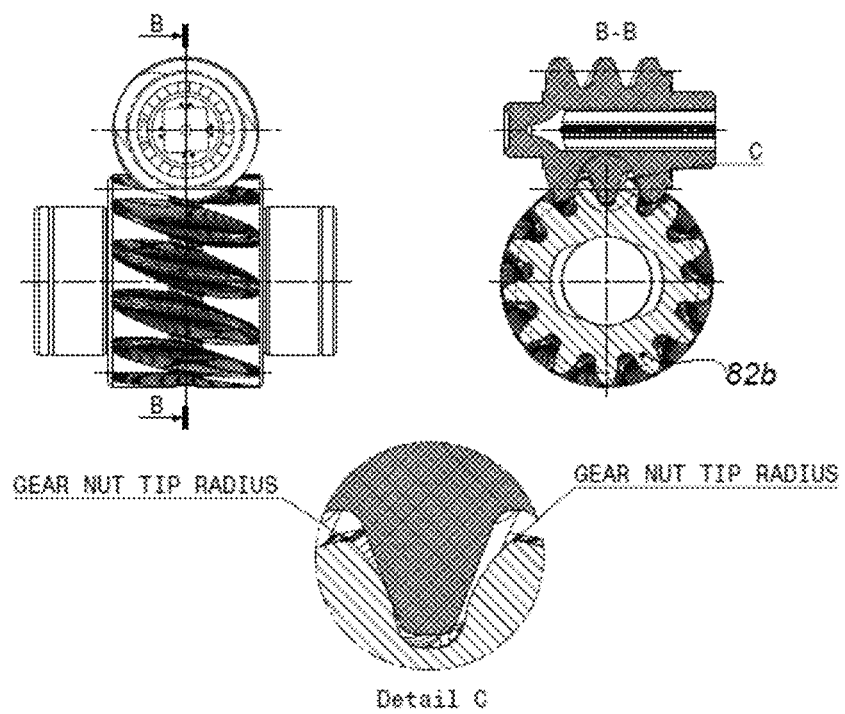
Figure 13A:
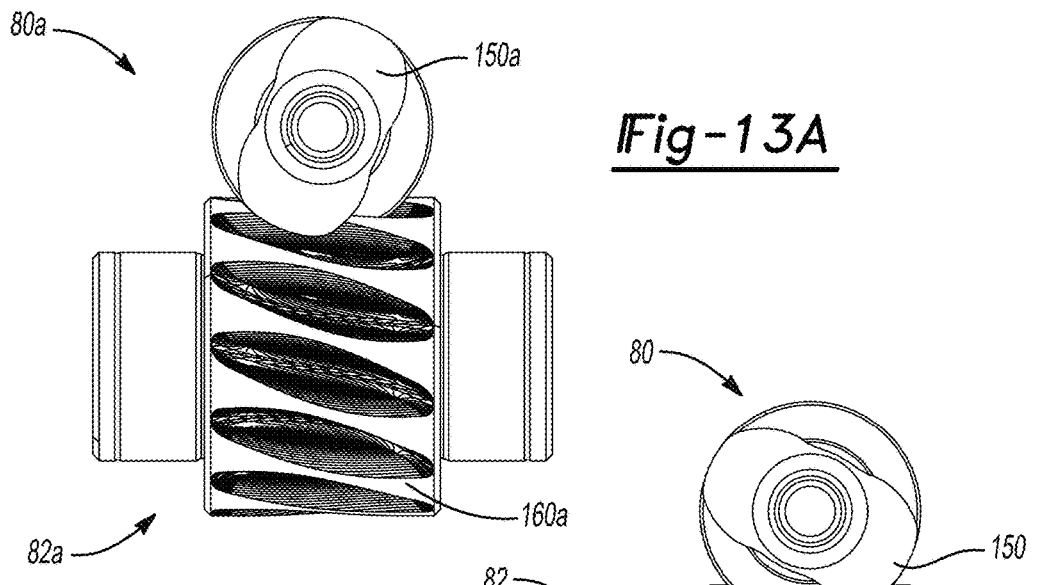
Figure 13B:
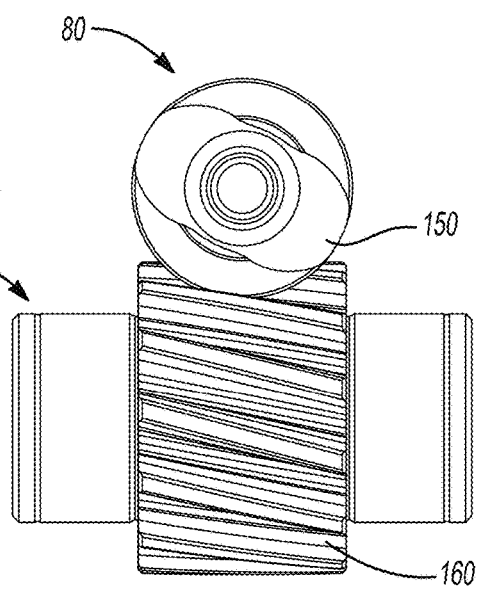
Figure 13C:
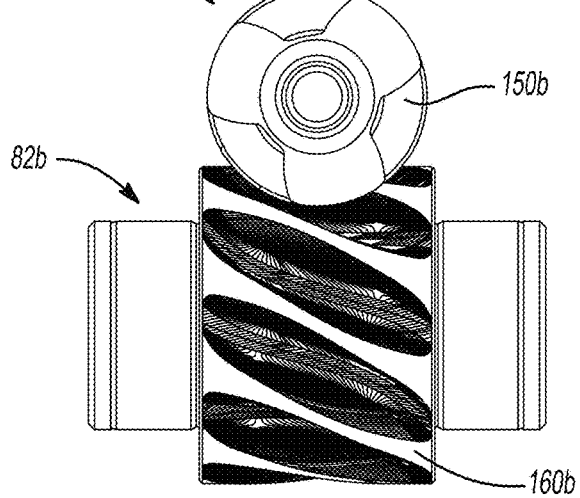
Figure 13D:
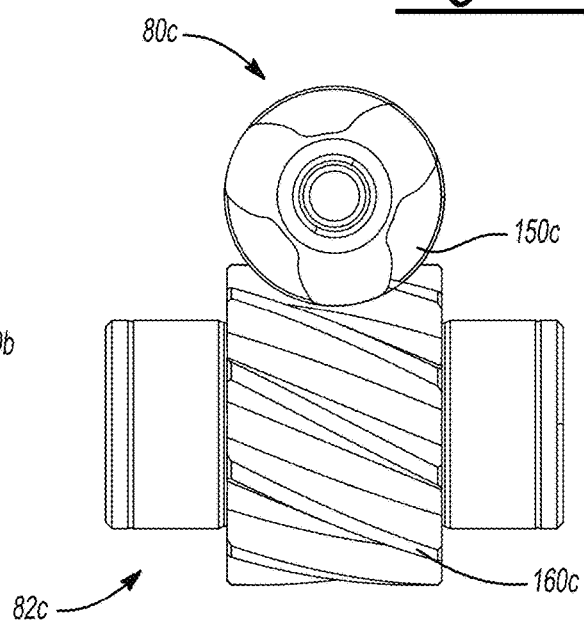
Figure 14A:
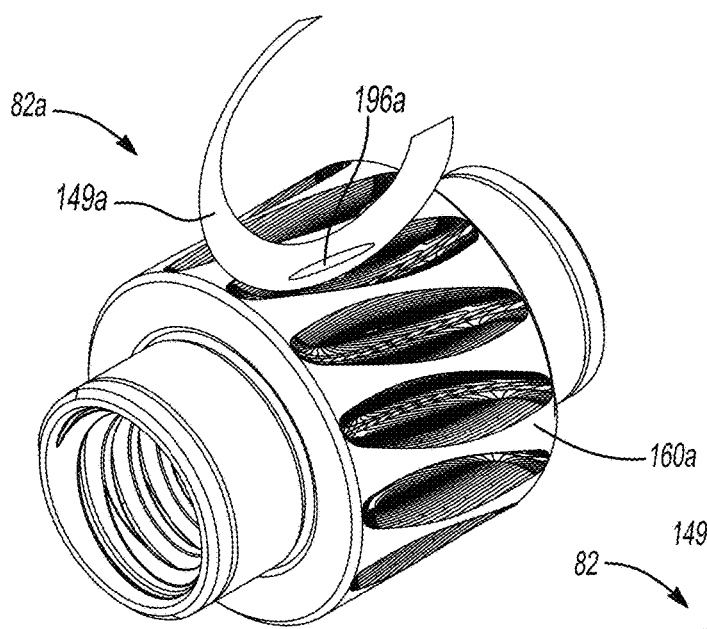
Figure 14B:
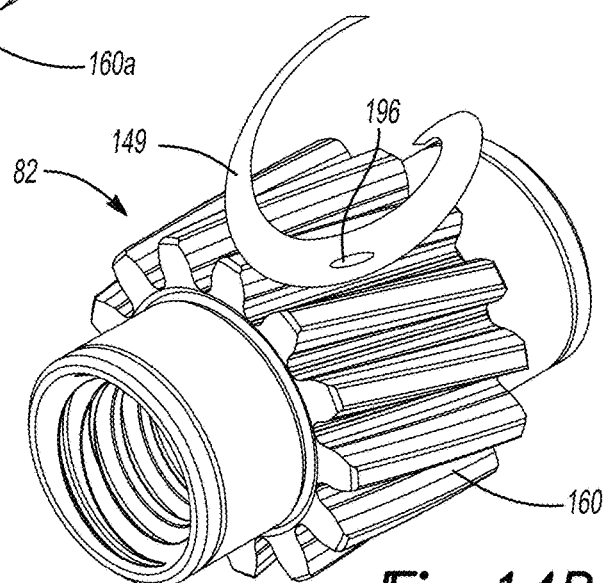
Figure 14C:
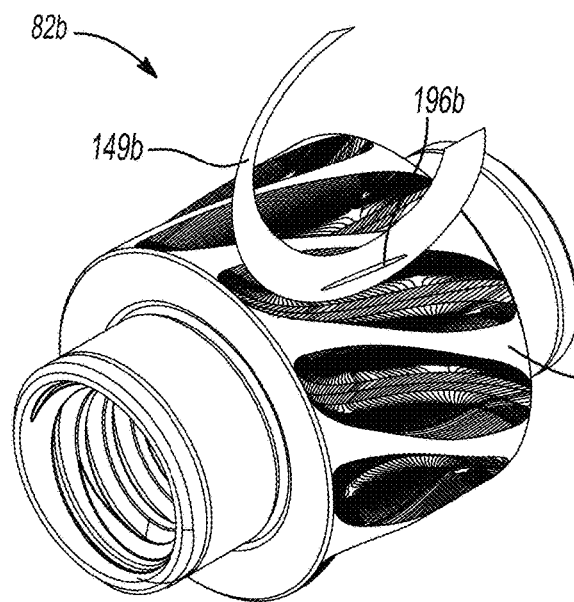
Figure 14D:
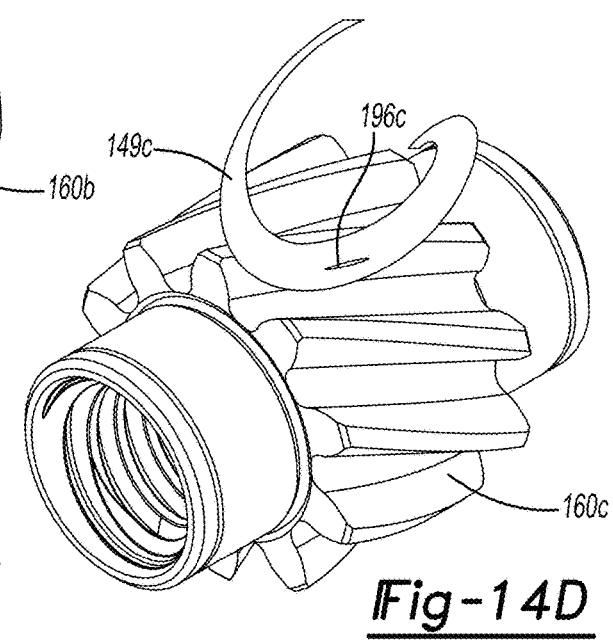
Figure 15:
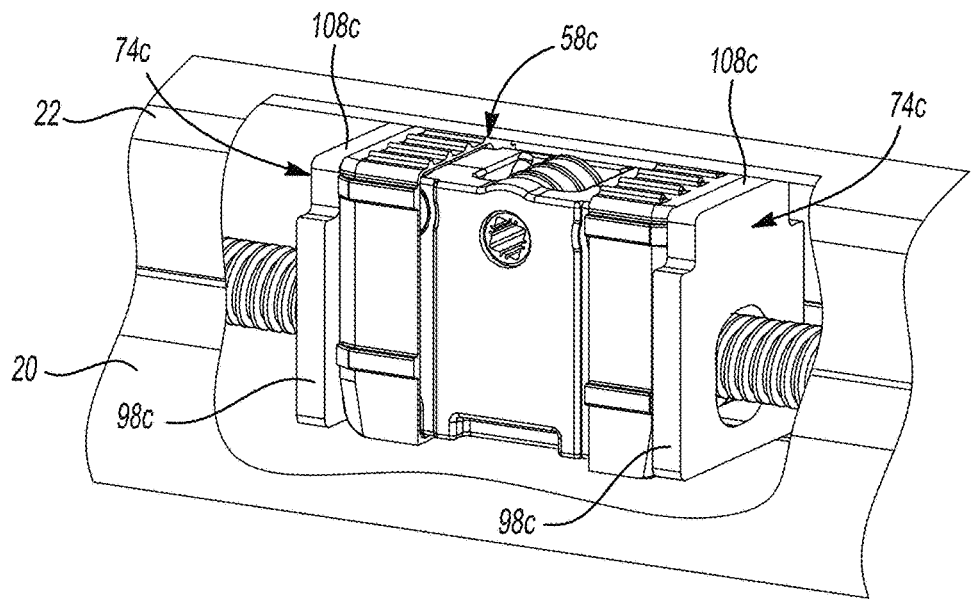
Figure 16:
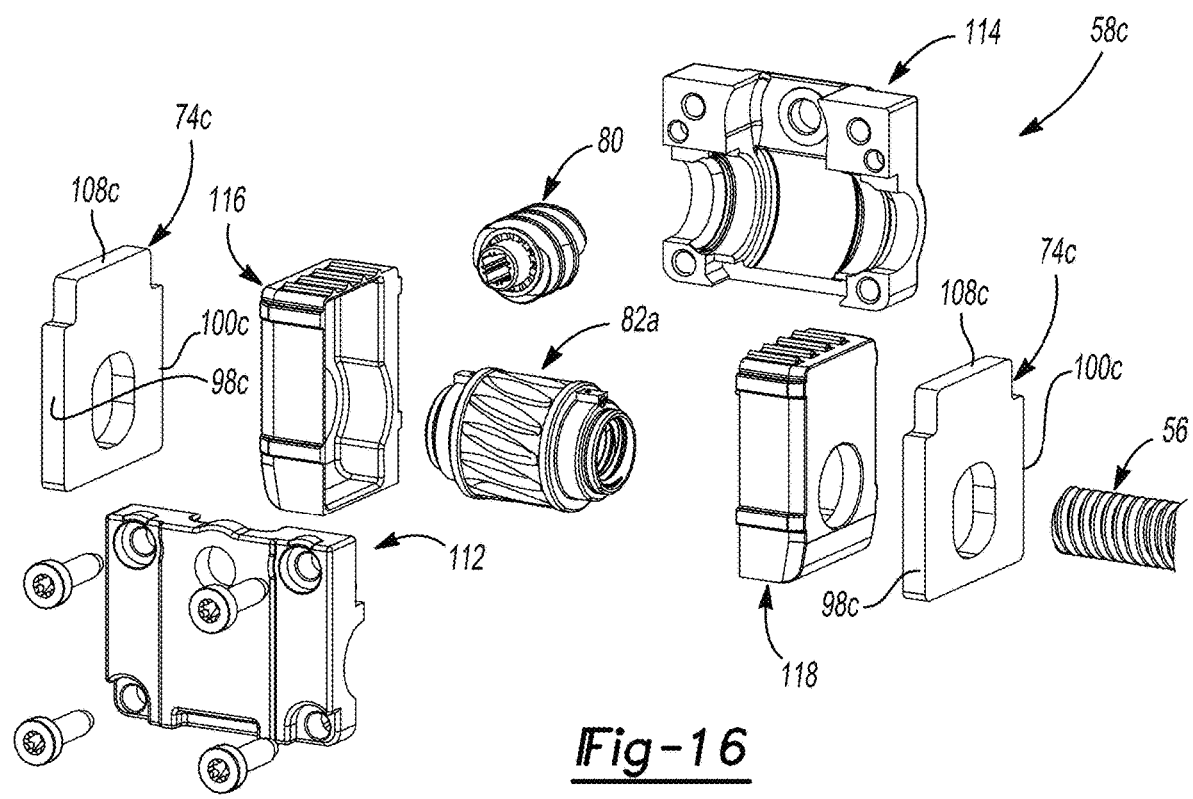
Figure 17:
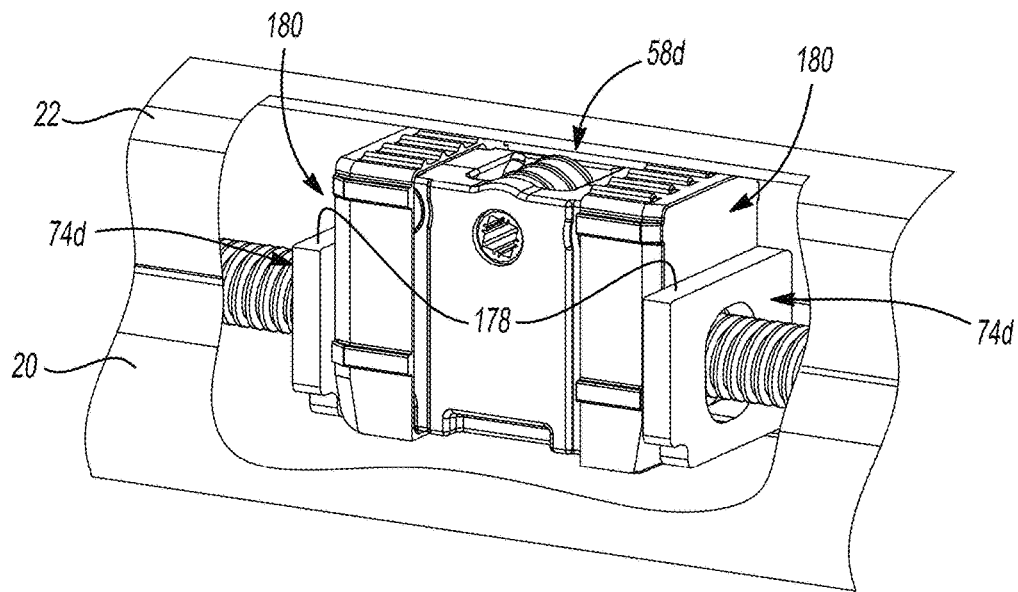
Figure 18:
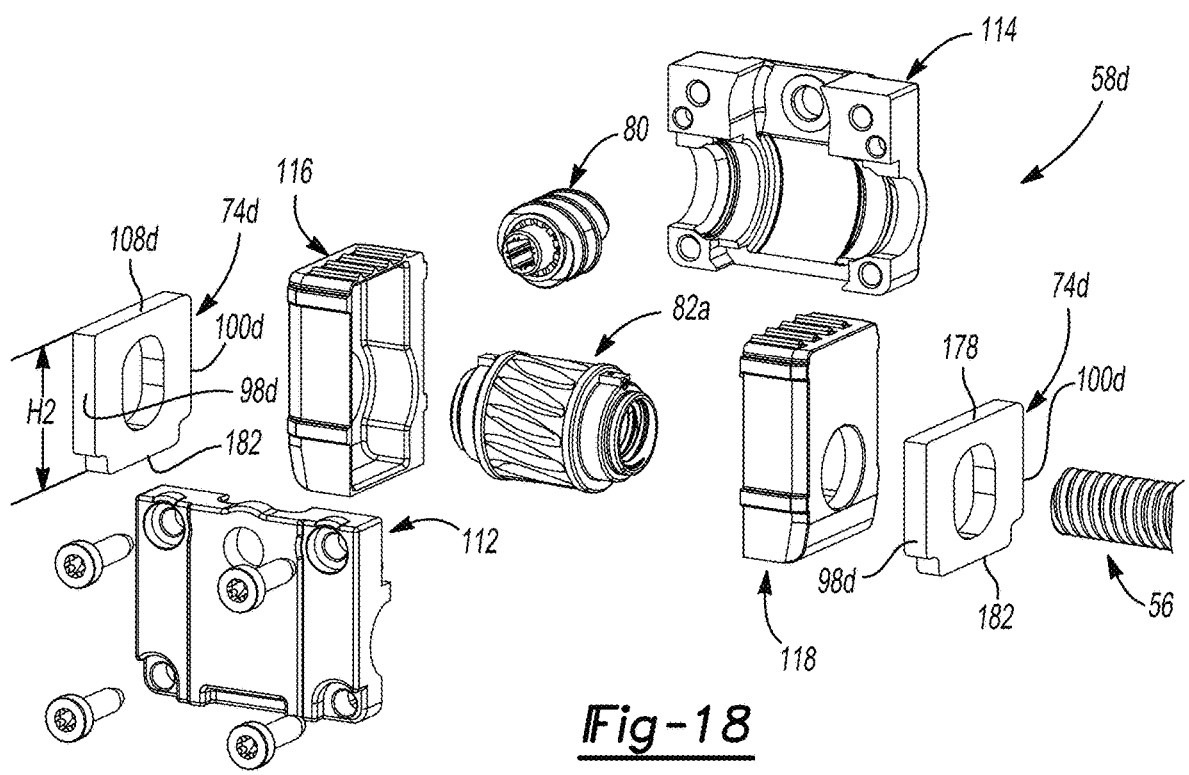
Figure 19:
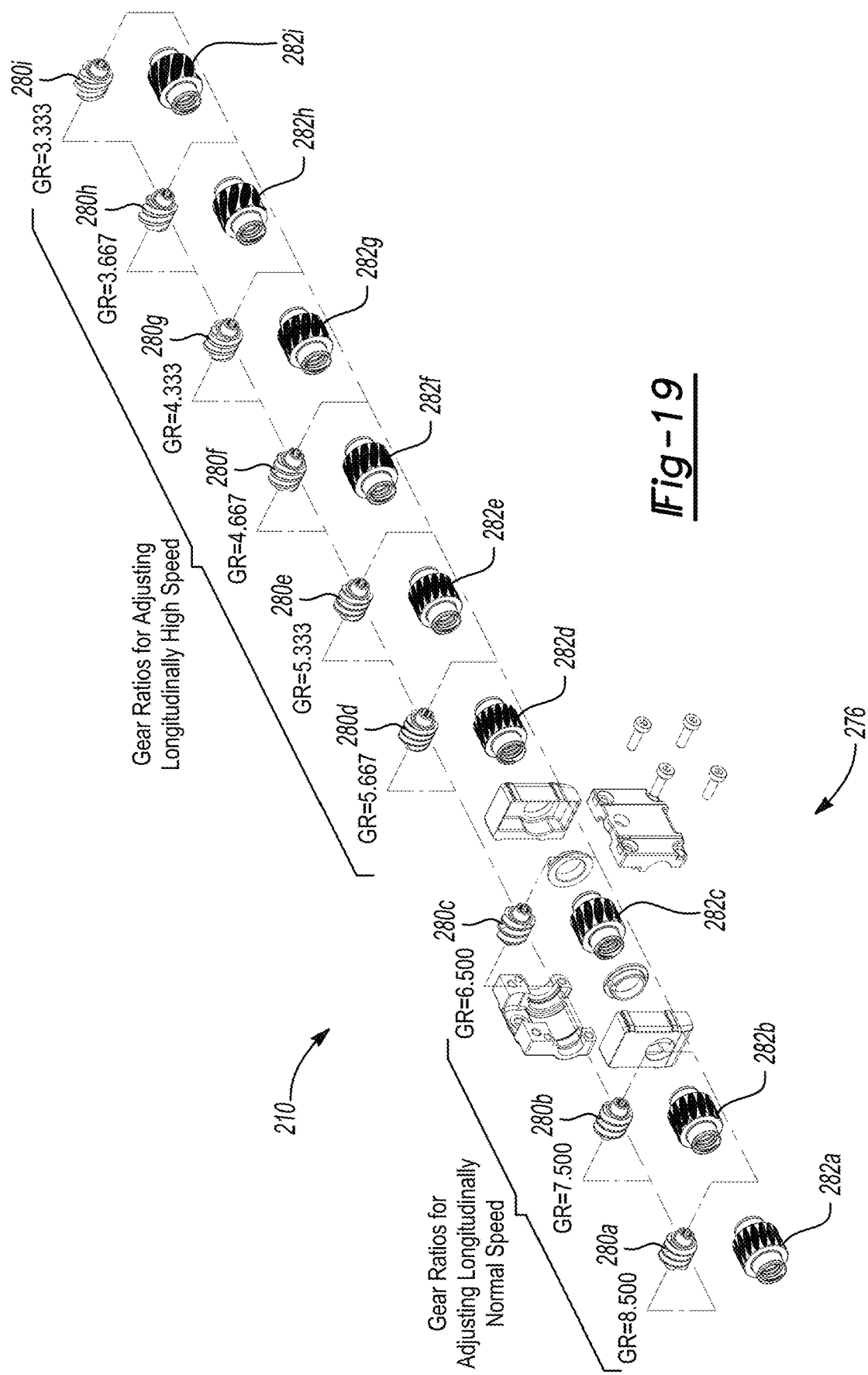

FIG. 4 is a partial perspective view of a power seat length adjuster assembly, including an orthogonal gear drive subassembly having a cylindrical worm in mesh with a mating helical gear, and a spindle screw and spindle nut subassembly, both mounted in a housing secured in a compressible relation to a seat upper track through a U-shaped support member in accordance with the principles of the present disclosure, a portion of the housing and the spindle screw being removed for clarity;

FIG. 5 is an exploded view of the power seat length adjuster assembly illustrated in FIG. 4;

FIG. 6 is a partial perspective view of a power seat length adjuster assembly, including an orthogonal gear drive subassembly having of a longitudinally crowned cylindrical worm in mesh with a mating single-enveloping worm gear, and a spindle screw and spindle nut subassembly, both mounted in a housing secured in a compressible relation to a seat upper track through a U-shaped support member, in accordance with the principles of the present disclosure, a portion of the housing and the spindle screw being removed for clarity;

FIG. 7 is an exploded view of the power seat length adjuster assembly illustrated in FIG. 6;

FIG. 8 is a perspective view of a gear drive subassembly including a longitudinally crowned worm in mesh with a mating single-enveloping worm gear manufactured by an oversized hob, in accordance with the principles of the present disclosure;

FIG. 9A is a side view of the longitudinally crowned worm, manufactured in accordance with the principles of the present disclosure, illustrated in FIG. 8;

FIG. 9B is a side section view showing the tooth profile of a double-crowned worm;

FIG. 10 is a partial perspective view of a single-enveloping worm gear hobbing process on a conventional hobbing machine using an oversized non-topping hob and a radial infeed, in accordance with the principles of the present disclosure;

FIG. 10A is a partial perspective view of a single-enveloping worm gear hobbing process on a conventional hobbing machine using an oversized topping hob and a radial infeed, in accordance with the principles of the present disclosure;

FIG. 10B is a perspective view a conventional hobbing machine used for cutting the teeth of a single-enveloping worm gear using an oversized non-topping or an oversized topping hob, in accordance with the principles of the present disclosure;

FIG. 10C is a perspective view of a simulated hobbing process used for cutting the teeth of a single-enveloping worm gear using an oversized topping hob, in accordance with the principles of the present disclosure;

FIG. 10D is a perspective view of an oversized topping hob used for cutting the teeth of a single-enveloping worm gear, in accordance with the principles of the present disclosure;

FIG. 10E is a side view, cross-sectional view, and detail view of an assembly worm-worm gear, in which the single-envelope worm gear teeth without tip radius are cut using an oversized non-topping hob, in accordance with the principles of the present disclosure;

FIG. 10F is a side view, cross-sectional view, and detail view of an assembly worm-worm gear, in which the single-envelope worm gear teeth with tip radius are cut using an oversized topping hob, in accordance with the principles of the present disclosure;

FIG. 11 is a top view of a single-enveloping worm gear having its teeth cut through a hobbing process on a conventional hobbing machine using an oversized hob and a radial infeed, in accordance with the principles of the present disclosure;

FIG. 12 is a partial section view of the single-enveloping worm gear illustrated in FIG. 11, having its teeth cut through a hobbing process on a conventional hobbing machine using an oversized hob and a radial infeed, in accordance with the principles of the present disclosure;

FIG. 13A is a side view of an orthogonal gear drive subassembly mounted at the functional center distance CD for a longitudinally crowned worm and its mating single-enveloping worm gear manufactured by an oversized hob, in accordance with the principles of the present disclosure;

FIG. 13B is a side view of an orthogonal gear drive subassembly mounted at the functional center distance CD for a longitudinally crowned worm and its mating helical gear drive, in accordance with the principles of the present disclosure;

FIG. 13C is a side view of an orthogonal gear drive subassembly mounted at the functional center distance CD for a double-crowned worm and its mating single-enveloping worm gear manufactured by an oversized hob, in accordance with the principles of the present disclosure;

FIG. 13D is a side view of an orthogonal gear drive subassembly mounted at the functional center distance CD for a double-crowned worm and its mating helical gear drive, in accordance with the principles of the present disclosure;

FIG. 14A is a perspective view of instantaneous bearing contact patterns between the functional longitudinally crowned worm thread surface in mesh with a single-enveloping worm gear tooth surface having the teeth cut by a hob with a pitch diameter identical to the pitch diameter of the functional worm;

FIG. 14B is a perspective view of instantaneous bearing contact patterns between the functional longitudinally crowned worm thread surface in mesh with a helical gear drive, in accordance with the principles of the present disclosure;

FIG. 14C is a perspective view of instantaneous bearing contact patterns between the double-crowned worm thread surface in mesh with a single-enveloping worm gear tooth surface having the teeth cut by an oversized hob, in accordance with the principles of the present disclosure;

FIG. 14D is a perspective view of instantaneous bearing contact patterns between the double-crowned worm thread surface in mesh with a helical gear drive, in accordance with the principles of the present disclosure;

FIG. 15 is a perspective partial view of a power seat length adjuster assembly, including an orthogonal gear drive subassembly having a longitudinally crowned cylindrical worm in mesh with a mating single-enveloping worm gear and, a spindle screw and spindle nut subassembly, both mounted in a housing secured in a compressible relation to a seat upper track through a support subassembly, partially received within the elongate slots of the top wall of the upper track and orbitally riveted or laser welded, in accordance with the principles of the present disclosure, a portion of the housing and the spindle screw being removed for clarity;

FIG. 16 is an exploded view of the power seat length adjuster assembly illustrated in FIG. 15;

FIG. 17 is a partial perspective view of a power seat length adjuster assembly, including an orthogonal gear drive subassembly having a longitudinally crowned cylindrical worm in mesh with a mating single-enveloping worm gear and, a spindle screw and spindle nut subassembly, both mounted in a housing secured in a compressible relation to a seat upper track through a support subassembly, partially received within the elongate closed slots of both side walls of the upper track and laser welded, in accordance with the principles of the present disclosure, a portion of the housing and the spindle screw being removed for clarity;

FIG. 18 is an exploded view of the power seat length adjuster assembly illustrated in FIG. 17;

FIG. 19 is an exploded view of an open architecture power seat length adjuster assembly, constructed in accordance with the principles of the present disclosure, where worm-worm gear drives for achieving nine different gear ratios are shown; and FIG. 20 is an exploded view of an open architecture power seat length adjuster assembly, constructed in accordance with the principles of the present disclosure, where a helical design type worm-helical gear drives can be used achieving nine different gear ratios are shown.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
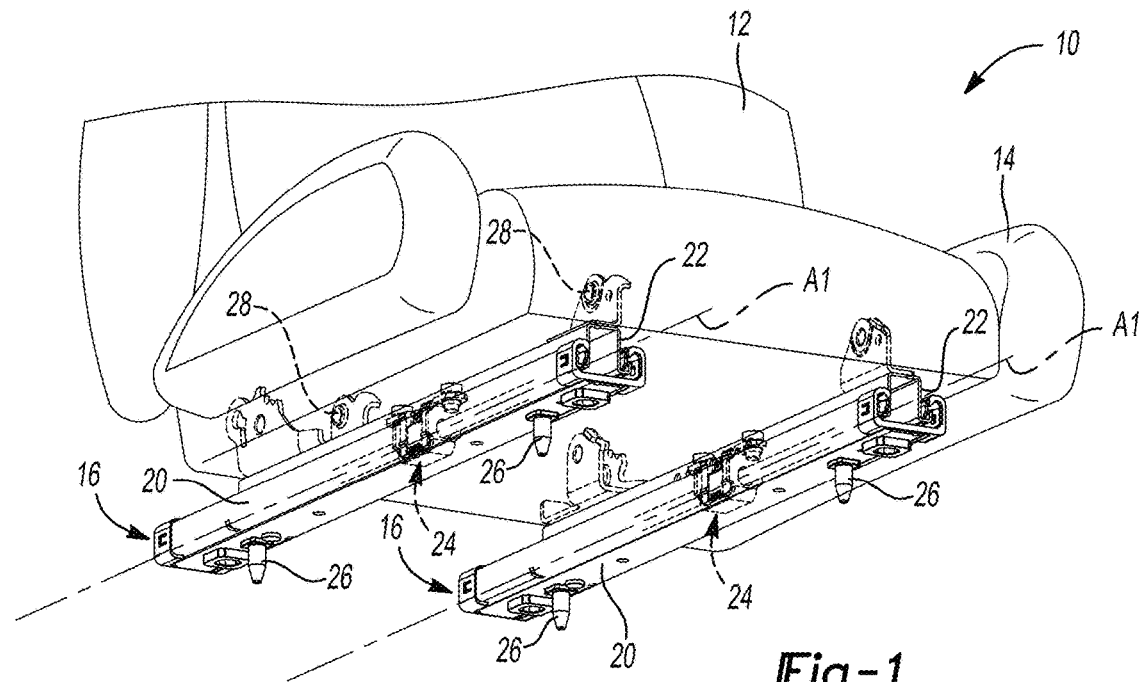
FIG. 1 is a partial perspective view of a vehicle seat assembly having a pair of seat track assemblies, including a power seat length adjuster assembly in accordance with the principles of the present disclosure.

With reference to FIG. 1, a seat assembly 10 is provided and may include a seatback 12, a seat bottom 14, and one or more seat track assemblies 16. In some implementations, the seat assembly 10 is adjustably mounted to a vehicle (not shown), such as an automobile. For example, a reclining mechanism (not shown) may pivotably move the seatback 12 relative to the seat bottom 14, and a pair of seat track assemblies 16 may translatably move the seat bottom 14 to a certain position relative to the vehicle floor pan (not shown). Accordingly, a user may selectively change the orientation of the seatback 12 relative to the seat bottom 14 using the reclining mechanism (not shown), and the position of the seat assembly 10 relative to the vehicle floor pan using the pair of seat track assemblies 16.

Figure 2:
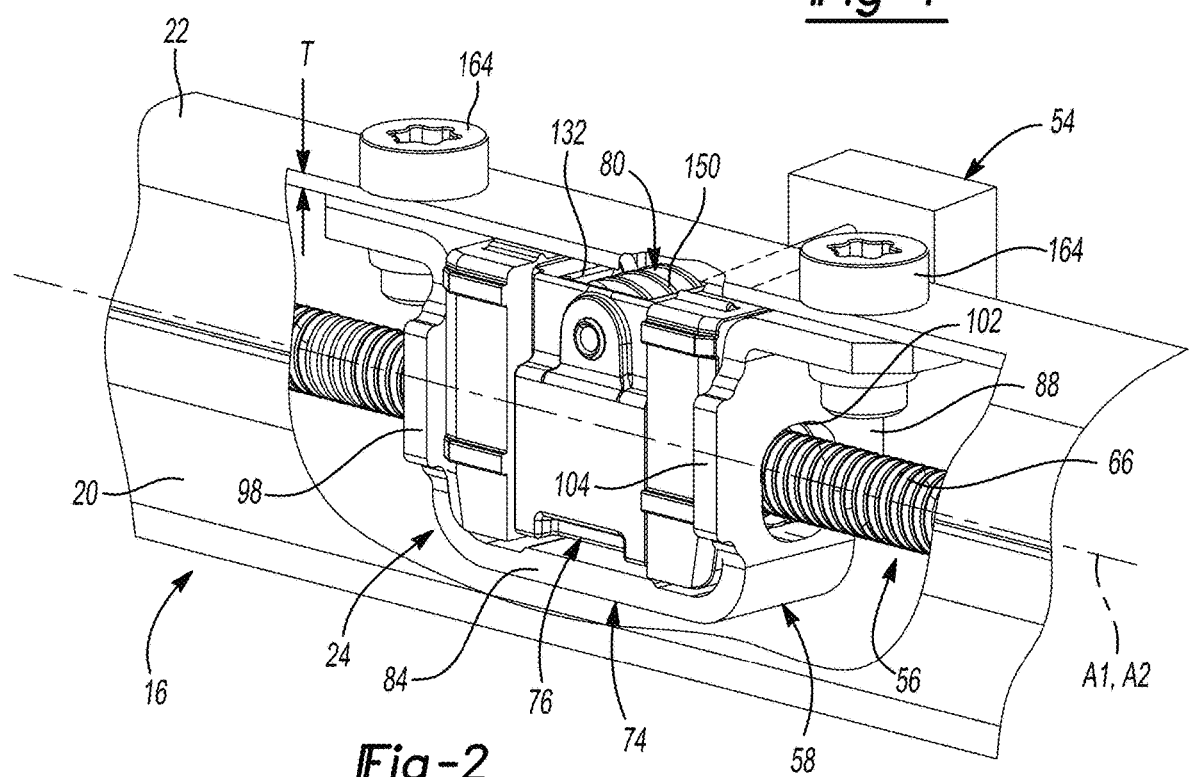
FIG. 2 is a partial perspective view of a seat track assembly, including a power seat length adjuster assembly in accordance with the principles of the present disclosure, a portion of the seat track assembly being removed for clarity.
Figure 3:
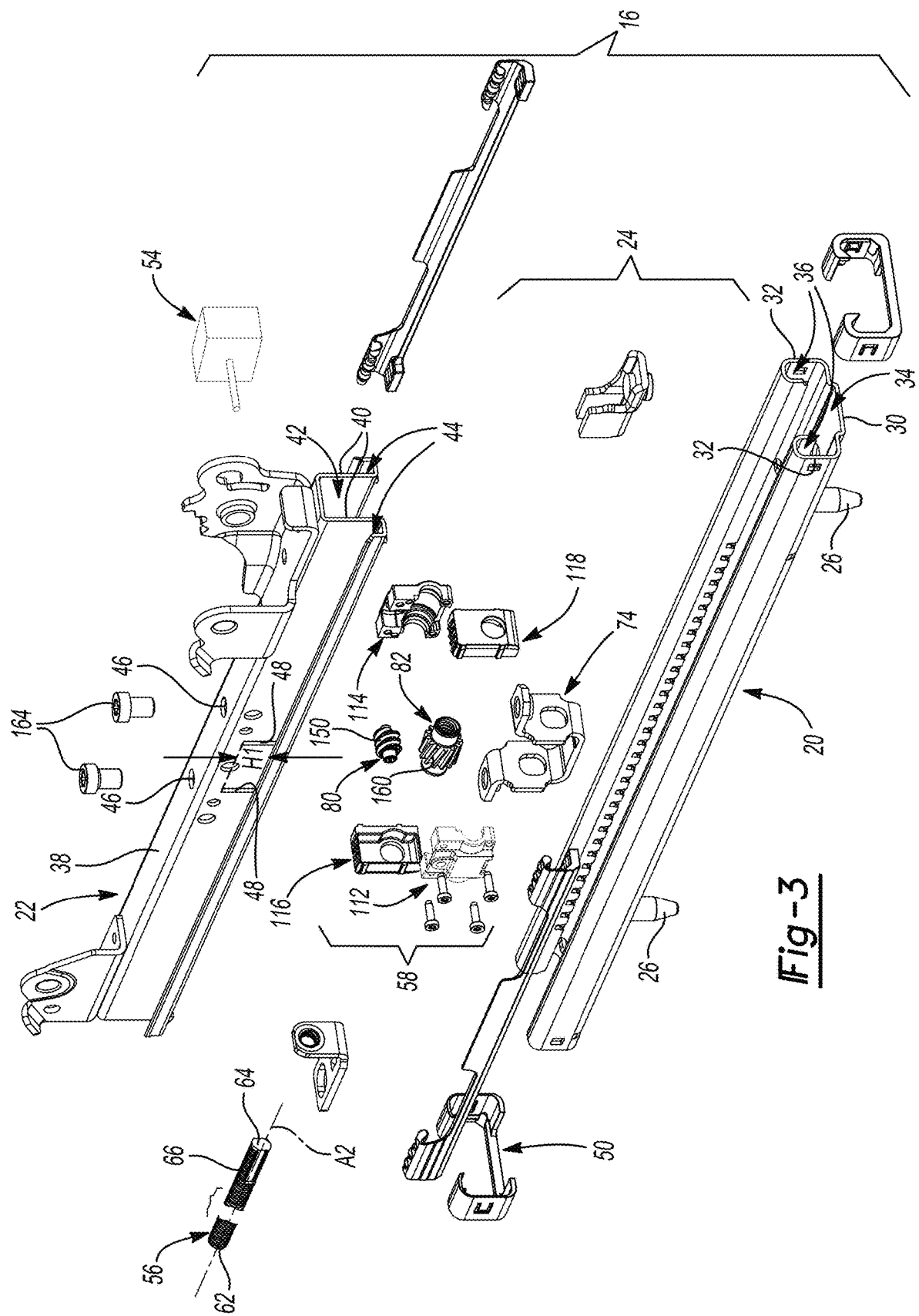
FIG. 3 is an exploded view of the seat track assembly illustrated in FIG. 2.

As illustrated in FIGS. 1-3, each seat track assembly 16 may include a lower track 20, an upper track 22, and an adjustment assembly 24. The lower track 20 may be fixedly attached to a portion of the vehicle using one or more mechanical fasteners 26 (e.g., bolts, screws, rivets, etc.), or any other suitable fastening technique, and may define an axis A1. The upper track 22 may be fixedly attached to a portion of the seat bottom 14 using one or more mechanical fasteners 28 (e.g., bolts, screws, rivets, etc.), or any other suitable fastening technique. In an assembled orientation (e.g., FIGS. 1 and 2), the lower track 20 may support the upper track 22 for translation along the axis A1, such that the upper track 22 translates relative to the vehicle. For example, the lower track 20 may slidably support the upper track 22 for translation along the axis A1.

With reference to FIG. 3, the lower track 20 may include a lower wall 30 and a pair of sidewalls 32 supported by, and extending transversely from, the lower wall 30. For example, the pair of sidewalls 32 may be integrally formed with, and extend perpendicularly from, opposed sides of the lower wall 30, such that the lower wall 30 and the sidewalls 32 cooperate to define a channel 34 extending in a direction substantially parallel to the axis A1. The sidewalls 32 may each define a U-shaped profile extending in a direction substantially parallel to the axis A1, such that each sidewall 32 defines a channel 36 extending in a direction substantially parallel to the axis A1.

The upper track 22 may include an upper wall 38 and a pair of sidewalls 40 supported by, and extending transversely from, the upper wall 38. For example, the pair of sidewalls 40 may be integrally formed with, and extend perpendicularly from, opposed sides of the upper wall 38, such that the upper wall 38 and the sidewalls 40 cooperate to define a channel 42 extending in a direction substantially parallel to the axis A1. The sidewalls 40 may each define a U-shaped profile extending in a direction substantially parallel to the axis A1, such that each sidewall 40 defines a channel 44 extending in a direction substantially parallel to the axis A1.

The upper wall 38 may include a first pair of apertures 46 (e.g., elongate slots), and the sidewalls 40 may each include a second pair of open apertures 48 (e.g., elongate slots). Each of the first pair of apertures 46 and each of the second pairs of open apertures 48 may be in fluid communication with the channel 42. In this regard, in some implementations, each of the first pair of apertures 46 and each of the second pairs of open apertures 48 may define a through-hole extending through a thickness T (FIG. 2) of the upper wall 38 and the sidewalls 40, respectively. Centerlines of the first pair of apertures 46 may be separated from one another by a first distance along the axis A1, and the second pair of apertures 48 may be separated from one another by a second distance along the axis A1. In some implementations, the first distance is substantially equal to the second distance, such that one aperture of the first pair of apertures 46 is substantially aligned with one aperture of each of the second pair of open apertures 48, and another aperture of the first pair of apertures 46 is substantially aligned with another open aperture of each of the second pair of open apertures 48. At least one of the second pair of open apertures 48 may be an elongate slot 48 defining a height H1 extending in a direction transverse to the axis A1. As will be explained in more detail below, a portion of the adjustment assembly 24 may be disposed within the first and/or second pairs of apertures 46 in order to secure the adjustment assembly 24 relative to the upper track 20.

As described above, the upper track 22 translates relative to the lower track 20 to permit selective movement of the seatback 12 and the seat bottom 14 relative to the vehicle. For example, a portion of each sidewall 40 of the upper track 22 may be slidably disposed within one of the channels 36 of the lower track 20, and a portion of each sidewall 32 of the lower track 20 may be slidably disposed within one of the channels 44 of the upper track 22. Movement of the upper track 22 relative to the lower track 20 may be facilitated by a carriage assembly 50, including two pairs of ball-cage assemblies 52, which may be: (i) secured to the upper track 22 and/or the adjustment assembly 24, and (ii) at least partially received within the channel 34 of the lower track 20.

With reference to FIGS. 2 and 3, the adjustment assembly 24 may include a driver assembly 54, a spindle screw 56, and a length adjuster assembly 58. In an assembled configuration, a portion of the adjustment assembly 24 may be secured relative to the vehicle and another portion of the adjustment assembly 24 may be secured relative to the upper track 22 to facilitate movement of the seatback 12 and the seat bottom 14 relative to the vehicle. For example, the spindle screw 56 may be secured to the lower track 20 and/or to the vehicle floor, while the length adjuster assembly 58 may be secured to the upper track 22. Accordingly, as will be explained in more detail below, movement of the length adjuster assembly 58 relative to the spindle screw 56 causes the fore and aft movement of the upper track 22 and the seat bottom 14 relative to the lower track 20 and ultimately to the vehicle floor.

The driver assembly 54 may include an electric bi-directional motor and two flex drive shafts that transfer the speed and torque from the electric motor to the length adjuster assembly 58 to cause the movement of the length adjuster assembly 58 along the spindle screw 56 length and, thus, the fore-and-aft movement of the seat assembly 10, relative to the vehicle floor.

The spindle screw 56 may include a front end 62 and a rear end 64. In some implementations, the spindle screw 56 may define a substantially cylindrical rod defining an axis A2 extending from the front end 62 to the rear end 64, and having an outer thread 66 extending along and about the axis A2 from the front end 62 to the rear end 64. In an assembled configuration, the spindle screw 56 may be disposed within one or both of the channel 34 of the lower track 20 and the channel 42 of the upper track 22 such that the axis A2 is substantially parallel to the axis A1. The front end 62 and rear end 64 may be secured relative to the lower track 20 and/or to the vehicle floor through the studs 26 rigidly mounted on the lower track 20. For example, the front end 62 may be supported by a front spindle bracket 68 that is secured to the lower track 20 and/or to the vehicle floor, and the rear end 64 may be supported by a rear spindle bracket 70 that is also secured to the lower track 20 and/or to the vehicle floor.

With reference to at least FIGS. 4 and 5, the power seat length adjuster assembly 58 may include a support member 74, a two-parts split housing assembly 76, a pair of thrust washers 77 each having an axially protruding tab 79, a pair of bearing bushings 78, a cylindrical worm 80 having helical outer threads 150 in mesh with external teeth 160 of a helical gear 82, a spindle nut integrally formed with the helical gear body 82 and having internal threads 158, and the spindle screw 56 with external thread 66 engaging the internal threads 158 of the spindle nut.

The support member 74 having a U-shape may include a base 84, a proximal arm 86, a distal arm 88, a proximal leg 90, and a distal leg 92. The proximal and distal arms 86, 88 may be supported by, and extend transversely from, the base 84. For example, the proximal and distal arms 86, 88 may be integrally formed with, and extend perpendicularly from, opposed ends of the base 84, such that the base 84 and the proximal and distal arms 86, 88 cooperate to define a channel 94. The proximal arm 86 may include a proximal aperture 96, a lateral ear 98, and a medial ear 100. Similarly, the distal arm 88 may include a distal aperture 102, a lateral ear 104, and a medial ear 106. In the assembled configuration, the proximal and distal apertures 96, 102 may be aligned with the axis A1. The lateral and medial ears 98, 100 may be supported by, and extend transversely from, the proximal arm 86. For example, the lateral and medial ears 98, 100 may be integrally formed with, and extend perpendicularly from, opposed sides of the proximal arm 86 by a distance X1 (FIG. 4). In some implementations, the distance X1 may be substantially equal to the thickness T of the upper wall 38 and the sidewalls 40, respectively, of the upper track 22.

The proximal and distal legs 90, 92 may be supported by, and extend transversely from, the proximal and distal arms 86, 88, respectively. For example, the proximal and distal legs 90, 92 may be integrally formed with, and extend perpendicularly from, the proximal and distal arms 86, 88, respectively, such that the proximal and distal legs 90, 92 are substantially parallel to the base 84. The proximal leg 90 may include a proximal retaining feature 108, and the distal leg 92 may include a distal retaining feature 110. In some implementations, the proximal retaining feature 108 may define a proximal aperture 108, and the distal retaining feature 110 may define a distal aperture 110.

With particular reference to FIG. 5, the housing assembly 76 may include a lateral housing cover 112 and a medial housing cover 114 made of zinc die-casting material, and two mirrored cover shells, including a proximal cover shell 116 and a distal cover shell 118. The lateral cover 112 may be substantially similar to the medial cover 114, and the proximal cover shell 116 may be substantially similar to the distal cover shell 118. Accordingly, references herein to the lateral cover 112 and the proximal cover shell 116 will be understood to apply equally to the medial cover 114 and the distal cover shell 116, respectively. The lateral cover 112 may include an aperture 120, a longitudinal recess 122, and an upper recess 124. The longitudinal recess 122 may extend from a proximal end 126 of the lateral cover 112 to a distal end 128 of the lateral cover 112. In an assembled configuration (e.g., FIGS. 2 and 4), the lateral cover 112 may be mated to the medial cover 114 such that (i) the aperture 120 of the lateral cover 112 is aligned with the aperture 120 of the medial cover 114, (ii) the recess 122 of the lateral cover 112 is aligned with the recess 122 of the medial cover 114 to cooperate to define a through-hole 130 (FIG. 4), and (iii) the recess 124 of the lateral cover 112 is aligned with the recess 124 of the medial cover 114 to cooperate to define an aperture 132 (FIG. 2) in communication with the through-hole 130.

The proximal cover 116 may include a recess 134 and an aperture 136 in communication with the recess 134, and may be formed from a resilient material having noise and vibration dampening characteristics. In some implementations, the proximal cover 116 may be formed from a polymer such as rubber, for example. In the assembled configuration, the proximal end 126 of the proximal and distal covers 116, 118 may be disposed within the recess 134 of the proximal cover 116, and the distal end 128 of the proximal and distal covers 116, 118 may be disposed within the recess 134 of the distal cover 118, such that the aperture 136 of the proximal cover 116 is aligned with the aperture 136 of the distal cover 118. In some implementations, one or more fasteners 137 (e.g., bolts or screws) may be disposed within the apertures 138 and 139 of the lateral and medial housing covers 112 and 114, respectively, to further secure the housing assembly 76. The housing assembly 76 may be coupled to the support member 74. For example, the housing assembly 76 may be disposed in a compressible secured relation within the channel 94 of the support member 74. The use of rubber cover shells 116 and 118, in compression against U-shaped bracket arms 86 and 88, will increase the damping capability of the power seat length adjuster assembly 58 in the process of vibration transmission to the seat structure.

As illustrated in FIG. 5, the bearing bushings 78 may include through-holes 140 that receive the outer bearing surfaces of helical gear 82, an annular flange 142 extending about the through-hole 140, as well as protruding features 143 for securing the bearing bushing against rotation while assembled within the housing assembly 76. As will be explained in more detail below, in the assembled configuration, each bearing bushing 78 will support both spindle nut bearing projections 145 for rotation relative to the housing assembly 76 within the through-hole 130. In order to avoid any damage to the bearing bushings contacting the interrupted end faces, while at the same time ensuring optimum support of helical gear bearing surfaces in bearing bushings of the housing plates, thrust washers 77 are inserted over the spindle nut bearing projections 145 and are placed against both end faces of the helical driven gear 82. In order to prevent the thrust washers 77 from sliding circumferentially, anti-rotation features or tabs 79 are disposed with, and engage, the helical driven gear teeth spaces. The thrust washers 77 are assembled between the annular flanges 142 and helical gear width sides such that their axial projection tabs 79 engage between two external teeth 160 of the helical gear 82. Thus, in addition to absorbing axial loads, the thrust washers 77 will not wear the bearing bushing flanges 142 during operation.

The cylindrical worm 80 may define an axis of rotation A3 extending from a proximal end 146 to a distal end 148, and may include one or more outer helical threads 150 disposed about the axis of rotation A3 between the proximal and distal ends 146, 148. In the assembled configuration (e.g., FIGS. 2 and 4), the worm 80 manufactured by an injection molding process from a plastic material such as PEEK 450G may be rotatably supported by the housing assembly 76. For example, the proximal end 146 of the worm 80 may be rotatably disposed within the aperture 120 of the lateral cover 112, and the distal end 148 of the worm 80 may be rotatably disposed within the aperture 120 of the medial cover 114, such that at least a portion of the helical thread 150 is disposed within, and/or visible through, the aperture 132 of the housing 76. Accordingly, the axis of rotation A3 of the worm 80 may extend in a direction transverse (e.g., perpendicular) to the axis A2 of the spindle screw 56.

As illustrated in FIG. 5, the helical gear 82 may define an axis of rotation A4 extending from a proximal end 154 to a distal end 156, and may include an inner thread 158 and a plurality of outer gear teeth 160. The inner thread 158 and the gear teeth 160 may be disposed about the axis of rotation A4. In the assembled configuration, the gear 82 may be disposed within the through-hole 130 of the housing assembly 76, such that the inner thread 158 is threaded to the outer thread 66 of the spindle screw 56, and the helical gear teeth 160 are meshed with the helical threads surfaces 149 of the cylindrical worm 80. The proximal end 154 bearing surface 143 may be disposed within the through-hole 140 of one of the bearing bushing 78, and the distal end 156 outer bearing surface 143 may be disposed within the through-hole 140 of another bearing bushing 78, such that the gear 82 is supported for rotation within the housing assembly 76. In this regard, the axis of rotation A4 may be aligned with (e.g., parallel to) the axis A2 of the spindle screw 56.

In the assembled configuration, the power length adjuster assembly 58 may be disposed within the channel 34 of the lower track 20 and/or the channel 42 of the upper track 22. In some implementations, the power length adjuster assembly 58 is supported by the upper track 22. For example, the support member 74 may engage the upper track 22. In particular, the lateral ear 98 of the proximal arm 86 may be disposed within one of the open apertures 48 of the sidewall 40 of the upper track 22, and the lateral ear 104 of the distal arm 88 may be disposed within another of the open apertures 48 of the sidewall 40 of the upper track 22. Similarly, the medial ear 100 of the proximal arm 86 may be disposed within one of the open apertures 48 of the sidewall 40 of the upper track 22, and the medial ear 106 of the distal arm 88 may be disposed within another of the open apertures 48 of the sidewall 40 of the upper track 22. In some implementations, the lateral ears 98, 104 and the medial ears 100, 106 may be disposed within the open apertures 48 in a clearance-fit configuration such that opposed sides of the proximal and distal arms 86, 88 abut the upper track 22. One of the apertures 46 of the upper wall 38 of the upper track 22 may be aligned with the proximal aperture 108 of the support member 74, and another of the apertures 46 of the upper wall 38 of the upper track 22 may be aligned with the distal aperture 110 of the support member 74. In some implementations, one or more fasteners 162 (e.g., a bolt, screw, pin, etc.) may be disposed within the apertures 46, 108, and/or 110 to further secure the support member 74 and the power seat length adjuster assembly 58 relative to the upper track 22. Thus, the power seat length adjuster assembly 58 provides a limitation of axial displacement of the housing assembly 76 and, further, balancing the axial loads, when subjected to a force of a predetermined magnitude.

With reference to FIGS. 6-8, another power seat length adjuster assembly 58a is illustrated. The structure and function of the power seat length adjuster assembly 58a may be substantially similar to that of the power seat length adjuster assembly 58, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "a") are used to identify those features that have been modified.

The power seat length adjuster assembly 58a may include a longitudinally crowned worm 80a and a single-enveloping worm gear 82a. The single-enveloping worm gear 82a includes a plurality of outer gear teeth 160a, defined at least in part by a corresponding plurality of recesses 164, meshed with helical threads 150a of the longitudinally crowned worm 80a. The worm gear teeth 160a may collectively define a proximal annular surface 166 and/or a distal annular surface 168 opposite the proximal annular surface 166. In some implementations, the proximal and/or distal annular surfaces 166, 168 extend radially and continuously about the axis of rotation A4. In the assembled configuration, the worm gear 82a may be disposed within the through-hole 130 of the housing assembly 76, such that the annular surfaces 166, 168 engage the housing 76 through the bearing bushings 78 that are not rotating inside the apertures of the lateral and medial covers 112, 114.

As illustrated in FIGS. 8, the power seat length adjuster assembly 58a includes an orthogonal crossed-axis gear drive including the worm 80a with its threads 150a extending along, and about, the axis of rotation A3, and meshed with the teeth 160a of the single-enveloping worm gear 82a, having its axis of rotation A4. Each recess 164 is defined by a single, continuous crescent surface having a radially extending dimension Z, an axially extending dimension Y, and a circumferentially extending dimension C. The teeth 160a height is defined by maximum outer and minimum root diameters Da2 and Df2, respectively.

The teeth 160a of the single-enveloping worm gear 82a are generated using an oversized hob such that the instant theoretical contact with the worm threads 80a is a point contact. A gear drive with such a contact exhibits less sensitivity to manufacturing and assembly errors and, thus, reduced vibrations and noise. In order to improve the contact localization on the worm gear tooth surface, and finally the efficiency of such a gear drive, a longitudinal crowning is applied to the pitch surfaces 149a. The side end faces of the space between the teeth 160a of the single-enveloping worm gear 82a defines uninterrupted, continuous annular surface 166 and 168 at both ends, thus eliminating the need for thrust washers 77 in the power seat length adjuster assembly 58a, and further eliminating the need for a deburring operation in a process of manufacturing the single-enveloping worm gear 82*a*. As such, undesirable noise, specific for changing the direction of spindle nut axial travel along the spindle screw axis can be also eliminated. Further, the robustness of the teeth 160*a* under bending loads is improved and the mass and the cost of the power seat length adjuster assembly 58*a* is reduced.

As shown in FIG. 9A, compared to the cylindrical shape 151 of a classical worm pitch surface, the pitch surface 149*a* of longitudinally crowned worm 80*a* deviates from a cylindrical shape, having a slightly barrel shape with an arcuate profile 152 that is parabolic and symmetric relative to the centerline 153 of the worm thread length. For example, the pitch surface 149*a* is similar to the pitch surface of the oversized hob 170 used in manufacturing the single-enveloping worm gear 82*a*. The maximum amount of longitudinal crowning δlmax is on the order of a couple of tens of micrometers (i.e., 10-30 micrometers), enough to provide the necessary shift of bearing contact pattern on the mating worm gear tooth surface towards its center in the longitudinal dimension and, thus, avoiding an unwanted edge contact and improving the lubrication mechanism under the load. By longitudinally crowning the worm 80*a*, the bearing contact is localized in the central region of worm gear tooth relative to the its side faces, thus avoiding during operation the undesirable edge contact between the helical thread and worm gear teeth flanks. The pitch surface 149*a* of the helical thread of the worm 80*a* is longitudinally crowned such that the pitch surface 149*a* has an arcuate profile 152 moving from the proximal end 146 of the worm 80*a* to the distal end 148 of the worm 80*a*. The diameter d1 at mid-point M of the worm 80*a* is larger than the diameter d2 of the helical thread at the proximal and distal ends 146, 148 of the worm 80*a*.

The worm 80*a* may be manufactured from a plastic material, such as PEEK 450G, by an injection molding process that allows also for its pitch surfaces 149*a* to be longitudinally crowned through the hollow mold surface shape. Longitudinal crowning of the worm 80*a* also provides a parabolic function of negative transmission errors, such that worm gear flanks lag with respect to the worm threads 150*a*, thus being able to absorb the linear functions of transmission errors and reduce the vibrations in operation. The proper values for worm parabolic crowning, as well as for the ratio of the oversized pitch diameter to the worm pitch diameter, have been determined through a detailed computerized calculation and simulation of manufacturing process and contact analysis, described in more detail below, with the goal of reducing the transmission errors and achieving an optimized bearing contact that allows for improved efficiency. However, this technique does not provide a localization of the contact pattern on worm gear tooth height that would completely eliminate the sensitivity of the gear drive assembly to center distance variation as well as to any misalignment errors, which are the source of vibrations, wear, and noise during operation.

As shown in FIG. 9B, the tooth profile 155 of the worm 80*b* can also be crowned, creating a worm gear drive assembly that exhibits very low transmission errors and very low levels of noise and vibrations during operation. The result of this is a double-crowning of pitch surfaces 149*b* of the worm 80*b*. The teeth 160*b* of the single-enveloping worm gear 82*b* generate a theoretical point contact with the helical thread of the worm 80*b*. A gear drive with such a contact exhibits less sensitivity to manufacturing and assembly errors, and thus, reduced vibrations and noise. In order to further improve the contact localization on the worm gear tooth surface and the efficiency of such a gear drive, crowning in the longitudinal direction and crowning of the tooth profile 155 is applied to the pitch surfaces 149*b*. The longitudinal crowning of the worm 80*b* provides a parabolic function of negative transmission errors able to absorb the linear functions of transmission errors, while the tooth profile crowning and use of the oversized hob 170 in the process of cutting the worm gear teeth work together to provide the central localization of the contact pattern relative to the worm gear tooth width and height, respectively. In addition, the radial infeed method using the oversized hob 170 will increase the radius of curvature of worm gear tooth, causing the tooth contact to be localized in the center region of the worm gear teeth. The pitch surface 149*b* of the helical thread of the worm 80*b* has a parabolic tooth profile 155 that extends in an angular direction AD between a top land 157 and a bottom land 159. The angular direction AD lies at an angle and therefore has a radial component and a longitudinal component. The parabolic tooth profile 155 is crowned (i.e., bows) outwardly along a convex curve 161, which departs from straight line 163 representing the tooth profile of a traditional worm. The maximum amount of crowning in the angular (height) dimension δhmax is on the order of a couple of micrometers, enough to provide the necessary shift of bearing contact pattern on the mating worm gear tooth surface towards its center in the height dimension and, thus, avoiding an unwanted edge contact and improving the lubrication mechanism under the load. The parabolic tooth profile 155 curves in on either side of pitch point 165 to the top and bottom lands 157, 159, respectively. Although other configurations are possible, in the illustrated embodiment, the pitch point 165 is positioned half way between the top and bottom lands 157, 159.

As illustrated in FIG. 10-12 the single-enveloping worm gear 82*a* or 82*b* may be economically and quickly manufactured from a metallic material (e.g., steel) utilizing an oversized non-topping hob 170 or an oversized topping hob 170*a*, by a cutting process on a conventional hobbing machine-tool 172, using a radial infeed Sr. For example, the recesses 164 of the single-enveloping gear 82*a*, having internal thread 158 and its outer diameter Da2, may be formed by radially feeding an oversized hob 170 of an outer diameter dah into the worm gear blank 174, in a direction 176 perpendicular to the axis of rotation A4. During the hob travel to the worm gear tooth full depth (e.g. the diameter D/2), at an infeed rate Sr [mm/rot], both the hob 170 and the worm gear blank 174 are rotating about their axes of rotation Ah and A4, respectively, with angular speeds nh and nwg, respectively. These speeds are time synchronized through the hobbing machine kinematics such that nh/nwg=Nwg/Nh=$i_{12}$, where, Nw, Nwg and $i_{12}$ are the number of starts or threads of the oversized hob, the number of teeth of the worm gear to be cut and, the gear ratio of the functional gear drive, respectively. Using an oversized hob with its pitch diameter greater that the pitch diameter of the functional worm, allows for an increased radius of curvature of the worm gear tooth, causing the tooth bearing contact to be concentrated in the center region of the worm gear teeth surface.

The process of the worm gear tooth hobbing using an oversized hob creates worm profile crowning with respect to the hob, allowing for a point contact between the thread 150*a* of the worm 80*a* and flank of the teeth 160*a* of the worm gear 82*a*, instead of a line contact. The direction of hob axis Ah is inclined at an angle Δ relative to the direction of worm axis A3, in a plane parallel to the plane tangent to both worm gear 82*a* and oversized hob 170 pitch cylinders, due to the difference between the pitch diameters, and implicitly outer diameters dah and dal of hob 170 and functional worm 80a, respectively. Thus, in the process of cutting the recesses 164 of a left or right-hand single-enveloping worm gear teeth 160, the hob 170 is set up in the proper positions 178 or 180 such that the hob axis AhL or AhR is inclined at an angle ΔL or ΔR relative to the projection 182 of the worm axis A3 passing through a point 184. This point 184 is the intersection between the direction 176 of the worm gear width centerline and the direction 179 of hob width centerline.

The initial setup positioning, outside of the worm gear blank to be cut, of the oversized hob 170 relative to the worm gear 82a blank centered on the hobbing machine-tool 172 rotating table support 186 is done using a machine-tool vertical sliding table 188, a transversal sliding table 190a, and a cradle angular table 192. The radial infeed Sr of the hob is performed along the direction 176, by a machine-tool slidable mount 194.

The worm gear 82a, of similar type as the worm 80a, is manufactured from steel by a radial infeed hobbing process, which eliminates completely the necessity of any axial feed, using the oversized hob 170. This manufacturing process increases the radius of curvature of worm gear tooth, causing the tooth contact to be concentrated in the center of the worm gear teeth width. The hobbing process of the worm gear tooth 160a using the oversized hob 170 also reduces the sensitivity of the gear drive assembly to center distance variation as well as to any misalignment errors, which cause vibrations in exploitation, wear, and noise during operation.

Using an oversized hob allows for a more robust tool design with a longer life expectancy and an increased quality of the worm gear cut teeth surfaces while a hob design with a greater number of flutes is possible. As such, the mesh efficiency of such a gear drive subassembly mounted at the functional center distance CD and illustrated in FIG. 13A, including the worm 80a having its threads 150a longitudinally crowned, and meshed with the teeth 160a of a single-enveloping worm gear 82a cut by an oversized hob, is estimated in the range of 65-70%. For comparison purpose, the mesh efficiency of a similar crossed-helical gear drive subassembly with the same gear ratio and dimensions, mounted at the functional center distance CD and illustrated in FIG. 13B, including the cylindrical worm 80 having its threads 150 meshed with the teeth 160 of mating helical gear drive 82, is estimated in the range of 60-65%. Another example of a gear drive subassembly mounted is illustrated in FIG. 13C, including the worm 80b with threads 150b that are double-crowned along the pitch surface 149b. The double-crowned threads 150b of the worm 80b mesh with the teeth 160b of a single-enveloping worm gear 82b cut by an oversized hob. The mesh efficiency of this arrangement is estimated in the range of 70-75%. Another example of a gear drive subassembly mounted is illustrated in FIG. 13D, including the worm 80c with threads 150c that are double-crowned along the pitch surface 149c. The double-crowned threads 150c of the worm 80c mesh with the teeth 160c of a mating helical gear 82c. The mesh efficiency of this arrangement is estimated in the range of 65-70%. In addition, by increasing the gear drive mesh efficiency, a small electric motor may be used to drive the assembly, with implications on lowering the cost of the power seat length adjuster assembly 58a.

The theoretical point contact sought by meshing a cylindrical worm thread having its surface 149a longitudinally crowned, with the teeth 160a of its mating single-enveloping worm gear 82a cut by an oversized hob under the load, becomes an ellipse-shaped bearing contact pattern 196a, spread over a significant region on the worm gear tooth surface, as illustrated in FIG. 14A. In order to localize the bearing contact pattern to a limited central region 196 of the worm gear tooth surface, as illustrated in FIG. 14B, longitudinal crowning can be applied to the worm thread surface 149. In order to further localize the bearing contact pattern to a further limited central region 196b of the worm gear tooth surface, as illustrated in FIG. 14C, double-crowning is applied to the pitch surface 149b of the worm 80b, as described earlier. In a similar approach shown in FIG. 14D, double-crowning is applied to the pitch surface 149c of the worm 80c, as described earlier. Such a localized contact pattern around the pitch point optimal mesh allows for decreasing gear drive sensibility to components manufacturing, assembly, and elastic deformations, increasing precision and gear drive load capacity, reducing the friction in operation, improving lubrication conditions, and avoiding non-uniform wear of component flanks in contact.

The gear drive subassemblies in FIGS. 13B and 14B and FIGS. 13D and 14D have a crossed-helical type gear drive configuration that consists of a cylindrical driving helical gear 82, 82c having a small number of teeth, e.g., a worm 80, 80c whose starts are engaged with the teeth of the cylindrical driven helical gear 82, 82c. The use of such a configuration has the advantage of a theoretical point contact between the worm starts flanks and helical gear teeth flanks surfaces, e.g., their mesh is insensitive to any axial misalignment of the spindle nut caused by assembly, component tolerances, and wear of the individual components.

However, the use of a cylindrical driven helical gear 82, 82c in combination with a worm 80, 80c has also some disadvantages. The open teeth space at both ends of the helical gear 82, 82c results in a configuration where the tooth roots of the helical gear teeth 160, 160c extend up to the end faces at which the spindle nut annular projections project. In order to avoid any damage to the bearing bushings 78 contacting the interrupted end faces, while at the same time ensuring optimum support of helical gear bearing surfaces in bearing bushings 78 of the housing plates, thrust washers 77 are required to be inserted over spindle nut bearing projections. These thrust washers 77 are placed against the both ends of the helical gear 82, 82c. In order to prevent these thrust washers 77 from sliding circumferentially they must have anti-rotation features 79 or tabs, which engage the helical gear teeth spaces. As additional required parts, they increase the fabrication and assembly expense for this type of gear drive subassembly. In addition, thrust washers 77 produce undesirable noises, especially when changing the direction of spindle nut axial travel along the spindle screw axis. When these thrust washers 77 are used, specifically, rattling and frictional noises are produced, caused by deviations in concentricity and shaft-center-distance tolerance variation. In addition, the axial play of the spindle nut within the housing is increased by the summation of individual tolerances. Additional teeth deburring operation is also required on both ends of the helical gear 82, 82c.

As shown in FIGS. 13A and 14A and FIGS. 13C and 14C, an orthogonal single-enveloping worm gear drive configuration can be used instead of a crossed-helical gear drive configuration to overcome the aforementioned disadvantages. An orthogonal single-enveloping worm gear drive consists of a worm 80a, 80b and a mating worm gear 82a, 82b. This arrangement is capable of providing a high gear ratio, low noise, and a compact structure. According to DIN 3975 standard, worm gear drives fall into one of five main types: ZA, ZN, ZE (ZI) and ZK-type. Based on its specific type, both the worm 80a, 80b and worm gear 82a, 82b components, may be manufactured from steel or plastic material by a cutting or injection molding process, correspondingly. As discussed above, worm 80b has the pitch surface 149b crowned in both, profile (angular) and longitudinal directions, in comparison with the hob thread surface used to manufacture the mating worm gear 82b. Due to worm thread profile crowning, the bearing contact is localized in the central region of worm gear tooth height, thus avoiding during operation the undesirable tip edge contact between the helical thread and worm gear teeth flanks. Moreover, use of a single-enveloping type worm gear 82b instead of a classical helical gear 82 allows for elimination of the two thrust washers 77 because worm gear 82b has side end faces that are not interrupted by teeth. The worm gear 82b has complete annular surfaces at both ends, thus eliminating also the necessity of an additional deburring operation of its teeth. With reference to FIGS. 15 and 16, another power seat length adjuster assembly 58b is illustrated. The structure and function of the power seat length adjuster assembly 58b may be substantially similar to that of the power seat length adjuster assembly 58, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

The power seat length adjuster assembly 58b may include the longitudinally crowned worm 80a, the single-enveloping worm gear 82a, and a pair of support members 74b. The support members 74b may each include the lateral ear 98, the medial ear 100, and a retaining feature 108b. In some implementations, the retaining feature 108b may define an elongated pin portion 108b extending from each support member 74b. In the assembled configuration, one of the elongate apertures 46b of the upper wall 38 of the upper track 22 may be aligned with the pin portion 108b of a first of the support members 74b, and another of the elongate apertures 46b of the upper wall 38 of the upper track 22 may be aligned with the pin portion 108b of the second of the support members 74b. In some implementations, the pin portions 108b may be disposed within the apertures 46b in a slide-fit configuration such that the support members 74b abut the upper track 22. The elongated pin portion 108b is fastened to the upper wall 38 of the upper track 22 by an orbital riveting process or by a laser welding process as indicated in FIG. 15 by 200. As such, the support subassembly formed by members 74b allows for securing the housing 76 in a compressive relation to the upper track 22 and, ultimately, to the power seat length adjuster assembly 58b.

In the assembled configuration, the power length adjuster assembly 58b may be disposed within the channel 34 of the lower track 20 and/or the channel 42 of the upper track 22. In some implementations, the power length adjuster assembly 58b is supported by the upper track 22. For example, the support member 74b may engage the upper track 22. In particular, the lateral ear 98 of the proximal arm 86 may be disposed within one of the open apertures 48 of the sidewall 40 of the upper track 22, and the lateral ear 104 of the distal arm 88 may be disposed within another of the open apertures 48 of the sidewall 40 of the upper track 22. Similarly, the medial ear 100 of the proximal arm 86 may be disposed within one of the open apertures 48 of the sidewall 40 of the upper track 22, and the medial ear 106 of the distal arm 88 may be disposed within another of the open apertures 48 of the sidewall 40 of the upper track 22. In some implementations, the lateral ears 98, 104 and the medial ears 100, 106 may be disposed within the open apertures 48 in a clearance-fit configuration such that opposed sides of the proximal and distal arms 86, 88 abut the upper track 22. Thus, the power seat length adjuster assembly 58b provides a limitation of axial displacement of the housing assembly 76, and further, balancing the axial loads when subjected to a force of a predetermined magnitude.

A method of assembling the power length adjuster assembly 58b to the upper track 22 may include, in this succession: (i) coupling the pair of support members 74b to the upper track 22, (ii) coupling the housing 76 in a compressive relation between the support members 74b in a friction-fit orientation, and (iii) coupling the lead screw 56 to the power length adjuster assembly 58b in a direction parallel to A1. Coupling the housing 76, to the pair of support members 74b may include applying a force on the housing 76 with the pair of support members 74b in a direction extending substantially parallel to the axis A1.

With reference to FIGS. 17 and 18, another power seat length adjuster assembly 58c is illustrated. The structure and function of the power seat length adjuster assembly 58c may be substantially similar to that of the power seat length adjuster assembly 58, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "c") are used to identify those features that have been modified.

The power seat length adjuster assembly 58c may include the longitudinally crowned worm 80a, the single-enveloping worm gear 82a, and a pair of support members 74c. The support members 74c may each include a lateral ear 98c and a medial ear 100c. In the assembled configuration, the lateral ear 98c of each support member 74c may be disposed within one of the closed elongated apertures 48c of the sidewall 40 of the upper track 22, and the medial ear 100c of each support member 74c may be disposed within one of the closed elongated apertures 48c of the sidewall 40 of the upper track 22, such that the upper track 22 and an upper side 178 of the support member 74c define a gap or void 202 therebetween. In this regard, the support member 74c may define a height H2 extending from the upper side 108c to a lower side 204, opposite the upper side 108c. In some implementations, the height H2 may be less than the height HI of the open aperture 48. Once the support members 74c are disposed within the closed apertures 48c in a clearance-fit configuration such that opposed sides of the lateral ear 98c and a medial ear 100c abut the upper track 22, the support members 74c are laser welded to the sidewall 40 at both ends.

A method of assembling the power length adjuster assembly 58c to the upper track 22 may include, in this succession: (i) coupling the pair of support members 74c to the upper track 22, (ii) coupling the housing 76 in a compressive relation between the support members 74c in a friction-fit orientation, and (iii) coupling the lead screw 56 to the power length adjuster assembly 58c in a direction parallel to A1. Coupling the pair of support members 74c to the upper track 22 may include: (i) translating each support member 74c through one of the closed elongated apertures 48c and into the channel 42 in a first direction perpendicular to the axis A1, and (ii) translating each support member 74c within the channel 42 in a second direction perpendicular to the axis A1 and perpendicular to the first direction. In some implementations, translating each support member 74c in the first direction may occur before translating each support member 74c within the channel 42 in the second direction. Coupling the housing 76, to the pair of support members 74c may include applying a force on the housing 76 with the pair of support members 74c in a direction extending substantially parallel to the axis A1.

Typically, known powered seat length adjuster assemblies operate at a normal linear adjusting speed as low as 20 mm/s and, at a high linear adjusting speed as high as 60 mm/s (when an power easy-entry function is require). During fore-and-aft adjustment of the vehicle seat at high linear adjusting speeds, the worm may spin at quite considerable speeds, as high as 8,000 rotations per minute. These electric motors have been proven to be too noisy in such applications requiring high linear adjusting speeds. In order to reduce the noise and vibrations generated by an electric motor operating at such high speeds, which can be perceived as unacceptable by an occupant of the vehicle during vehicle seat length adjustment, the gear drive can be improved by giving it an open architecture that can accommodate a large range of different gear ratios in the same compact space.

With reference to FIG. 19, an open architecture power seat length adjuster assembly 210 is illustrated that is capable of realizing a large but finite range of different linear adjusting speeds, in the same compact space delimited by the seat upper track aperture and using the same seat structure. By using a range of different gear ratios, smaller electric motors having limited rotational speeds can be utilized to avoid the occurrence of vibrations and consequently noise. For each gear ratio, a single envelope worm-worm gear drives a reduction mechanisms with theoretical point contact. This provides very low level of noise and vibrations during operation and provides a gear mesh that is insensitive to misalignments and errors/variations in the component manufacturing process.

The open architecture of the powered seat length adjuster assembly 210 is capable of providing the required mechanical gear ratios, in the same compact space, using electric motors that have their speed limited to certain values. Because the worm-worm gear drives disclosed herein can be provided in a large range of gear reduction ratios in the same compact space, small electric motors having maximum rotational speeds limited to values that do not create vibrations and noise in operation are able to be used in a wide range of specific applications.

For example, typical known powered length adjusters operating at a normal or comfort linear adjusting speed as low as 20 mm/s use electric motors with a maximum rotational speed of around 4,900 rpm. These electric motors are proven to be relatively quiet in operation and have a reasonable overall dimensional envelope suited for use in such applications. Typical known powered length adjusters operating in easy-entry mode at a high linear adjusting speed as high as 60 mm/s use electric motors with a maximum rotational speed of around 8000 rpm. These electric motors have proven to be quite noisy in operation and have a larger overall dimensional envelope. For such applications, it may be desirable to have electrical motors with their maximum rotational speed capped (i.e., limited) to around 5,500 rpm.

The open architecture of the powered seat length adjuster assemblies disclosed herein allow for the use of different gear reduction ratios in the same limited space such that worm-worm gear drives with different gear reduction ratios, in a certain large but limited range, capable of carrying the required load, can be used to overcome the challenges related to manufacturing errors/variances and their noise, vibration, and harshness (NVH) behavior.

By the way of example only, the open architecture of power seat length adjuster assembly 210 illustrated in FIG. 19 has nine different worm-worm gear drives 280a-i/282a-i that can be swapped in and out of the housing assembly 276 for one another to pair different combinations of gears. For comfort speed (e.g., where the housing assembly 276, worm and worm gears move linearly along a length of the spindle screw at a velocity of 17-22 millimeters per second), an electric motor having its maximum rotational speed limited to a maximum of 5,500 rpm can be used when paired worm-worm gear drives 280a-c/282a-c with gear ratios of 6.5, 7.5, or 8.5, respectively. For high speed easy-entry function (e.g., where the housing assembly 276, worm and helical gears move linearly along a length of the spindle screw at a velocity of 55-60 millimeters per second), an electric motor having its rotational speed limited to a maximum of 5,500 rpm can be used when paired worm-worm gear drives 280d-i/282d-i with gear ratios of 5.667, 5.333, 4.667, 4.333, 3.667, and 3.333, respectively. As such, a single housing assembly 276 and seat structure, having the same architecture and dimensions, can be used for achieving the whole range of maximum comfort (normal) and high longitudinal adjustment speeds, with vibrations and noise in operation within required limits.

By the way of another example, the open architecture of power seat length adjuster assembly 310 illustrated in FIG. 20 has nine different worm-helical gear drives 380a-i/382a-i that can be swapped in and out of a housing assembly 376 (similar or identical to housing assembly 76, 276) for one another to pair different combinations of gears. For high speed (e.g., where the housing assembly 376, worm and helical gears move linearly along a length of the spindle screw at a velocity of 55-60 millimeters per second), an electric motor having its maximum (e.g., "no-torque") rotational speed of 5,500 rpm can be used when paired worm-helical gear drives 380a-c/382a-c with gear ratios of 3.333 (e.g., the worm 380a may have 3 starts and the helical gear 382a may have 10 teeth), 3.250 (e.g., the worm 380b may have 4 starts and the helical gear 382b may have 13 teeth), 3.200 (e.g., the worm 380c may have 5 starts and the helical gear 382c may have 16 teeth), respectively. For ultra-high speed (e.g., where the housing assembly 376, worm and helical gears move linearly along a length of the spindle screw at a velocity of 85-90 millimeters per second), an electric motor having its maximum rotational speed of 5,500 rpm can be used when paired worm-helical gear drives 380d-i/382d-i with gear ratios of 2.833 (e.g., the worm 380d may have 6 starts and the helical gear 382d may have 17 teeth), 2.800 (e.g., the worm 380e may have 5 starts and the helical gear 382e may have 14 teeth), 2.750 (e.g., the worm 380f may have 4 starts and the helical gear 382f may have 11 teeth), 2.600 (e.g., the worm 380g may have 5 starts and the helical gear 382g may have 13 teeth), 2.400 (e.g., the worm 380h may have 12 teeth and the helical gear 382h may have 5 teeth), 2.200 (e.g., the worm 380i may have 5 starts and the helical gear 382i may have 11 teeth), respectively. As such, a single housing assembly 376 and seat structure, having the same architecture and dimensions, can be used for achieving the whole range of high speed and ultra-high speed longitudinal adjustment speeds, with vibrations and noise in operation within required limits. The gear ratios listed above allow for the use of a motor with relatively low rotational velocity (e.g., maximum of 5,500 rpm) while still providing the desired speed ranges and while reducing noise and improving quality.

The open architecture power seat length adjuster systems of the present disclosure utilize advantageous combinations of electrical motor rotational velocity and gear ratios, which allow the position of the vehicle seat to be adjusted at desirable linear velocities. Furthermore, utilizing a motor with a maximum rotational velocity of 5,500 rpm will reduce the overall noise of the system and permit implementation of motor sensorless positioning (SLP) function which requires measurement of motor ripple current amplitude.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat adjuster assembly comprising:
   a housing;
   a worm disposed within the housing for rotation about a first axis and having a thread;
   a helical gear disposed within the housing for rotation about a second axis and meshingly-engaged with a pitch surface of the thread of the worm;
   a spindle screw extending through the housing and the helical gear along the second axis, the spindle screw being meshingly-engaged with the helical gear; and
   a motor driving the worm,
   wherein a gear ratio of the worm to the helical gear is selected from the group consisting of: 3.333, 3.25, 3.2, 2.833, 2.8, 2.75, 2.6, 2.4, and 2.2,
   wherein the motor has a maximum rotational velocity of 5,500 revolutions per minute or less, and
   wherein the pitch surface of the thread of the worm has a parabolic tooth profile.

2. The seat adjuster assembly of claim 1, wherein the gear ratio of the worm to the helical gear is selected from the group consisting of: 3.333, 3.25, and 3.2, and wherein the housing, the worm, and the helical gear move linearly along a length of the spindle screw at a velocity of 55-60 millimeters per second during operation of the motor.

3. The seat adjuster assembly of claim 1, wherein the gear ratio of the worm to the helical gear is selected from the group consisting of: 2.833, 2.8, 2.75, 2.6, 2.4, and 2.2, and wherein the housing, the worm, and the helical gear move linearly along a length of the spindle screw at a velocity of 85-90 millimeters per second during operation of the motor.

4. A seat track assembly comprising the seat adjuster assembly of claim 1, and further comprising a lower seat track and an upper seat track that is configured to engage the lower seat track and slide along a length of the lower seat track, wherein the housing is configured to be mounted to the upper seat track.

* * * * *